United States Patent
Fuse et al.

(10) Patent No.: US 7,801,300 B2
(45) Date of Patent: Sep. 21, 2010

(54) DATA TRANSMITTER AND DATA RECEIVER

(75) Inventors: Masaru Fuse, Osaka (JP); Satoshi Furusawa, Osaka (JP); Tsuyoshi Ikushima, Nara (JP); Tomokazu Sada, Osaka (JP)

(73) Assignee: Panasonic Corporation, Osaka (JP)

( * ) Notice: Subject to any disclaimer, the term of this patent is extended or adjusted under 35 U.S.C. 154(b) by 882 days.

(21) Appl. No.: 11/651,037

(22) Filed: Jan. 9, 2007

(65) Prior Publication Data

US 2007/0177724 A1  Aug. 2, 2007

(30) Foreign Application Priority Data

Jan. 11, 2006  (JP) ............... 2006-003527

(51) Int. Cl.
*H04N 7/16* (2006.01)
*H04L 29/00* (2006.01)
*H04L 9/00* (2006.01)
*H04L 9/20* (2006.01)

(52) U.S. Cl. .............. 380/28; 726/26; 713/150
(58) Field of Classification Search .......... 380/28, 380/42–44, 268; 398/77, 177; 708/250; 341/56, 173; 726/26; 713/150
See application file for complete search history.

(56) References Cited

U.S. PATENT DOCUMENTS 5,218,619 A  *  6/1993  Dent ..................... 370/209
6,125,378 A  *  9/2000  Barbano ................ 708/254
2005/0210244 A1 *  9/2005  Stevens et al. .......... 713/166

FOREIGN PATENT DOCUMENTS

| GB | 2242105 A | * | 9/1991 |
| JP | 06104793 A | * | 4/1994 |
| JP | 09-205420 |   | 8/1997 |

OTHER PUBLICATIONS

Asynchronous Operation, Latches. In Microsoft Computer Dictionary. Microsoft Press 2002.*

(Continued)

*Primary Examiner*—Kambiz Zand
*Assistant Examiner*—Imhotep Durham
(74) *Attorney, Agent, or Firm*—Wenderoth, Lind & Ponack, L.L.P.

(57) ABSTRACT

A data communication apparatus which causes the eavesdropper to take a significantly increased time to analyze a cipher text and provides high concealability is provided. A multi-level code generation section 111a generates, based on predetermined key information 11, a multi-level code sequence 12 in which a signal level changes so as to be approximately random numbers. A multi-level processing section 111b combines the multi-level code sequence 12 and information data 10, and generates a multi-level signal 13 having a plurality of levels corresponding to the combination of the multi-level code sequence 12 and the information data 10. A modulator section 112 treats the multi-level signal a predetermined modulating processing and generates a modulated signal. The multi-level code generation section 111a generates the multi-level code sequence 12 in accordance with a changed random number sequence which results from changing a bit series of a binary random number sequence generated based on the predetermined key information.

13 Claims, 22 Drawing Sheets

OTHER PUBLICATIONS

Welschanbach, Michael. Cryptography in C and C++. 2nd ed. Cryptography in C and C++. Apress, 2001. Print.*

"Cryptography and Network Security: Principles and Practice" Second Edition, William Stallings, Prentice-Hall, Inc., New Jersey, 1999, pp. 131-159.

"Applied Cryptography" Second Edition, Bruce Schneier, John Wiley & Sons, Inc., 1996, pp. 369-395.

"Cryptography and Network Security: Principles and Practice" translated by Keiichiro Ishibashi et al., Pearson Education, 2001.

"Applied Cryptography" translated by Mayumi Adachi et al., Softbank publishing, 2003.

* cited by examiner

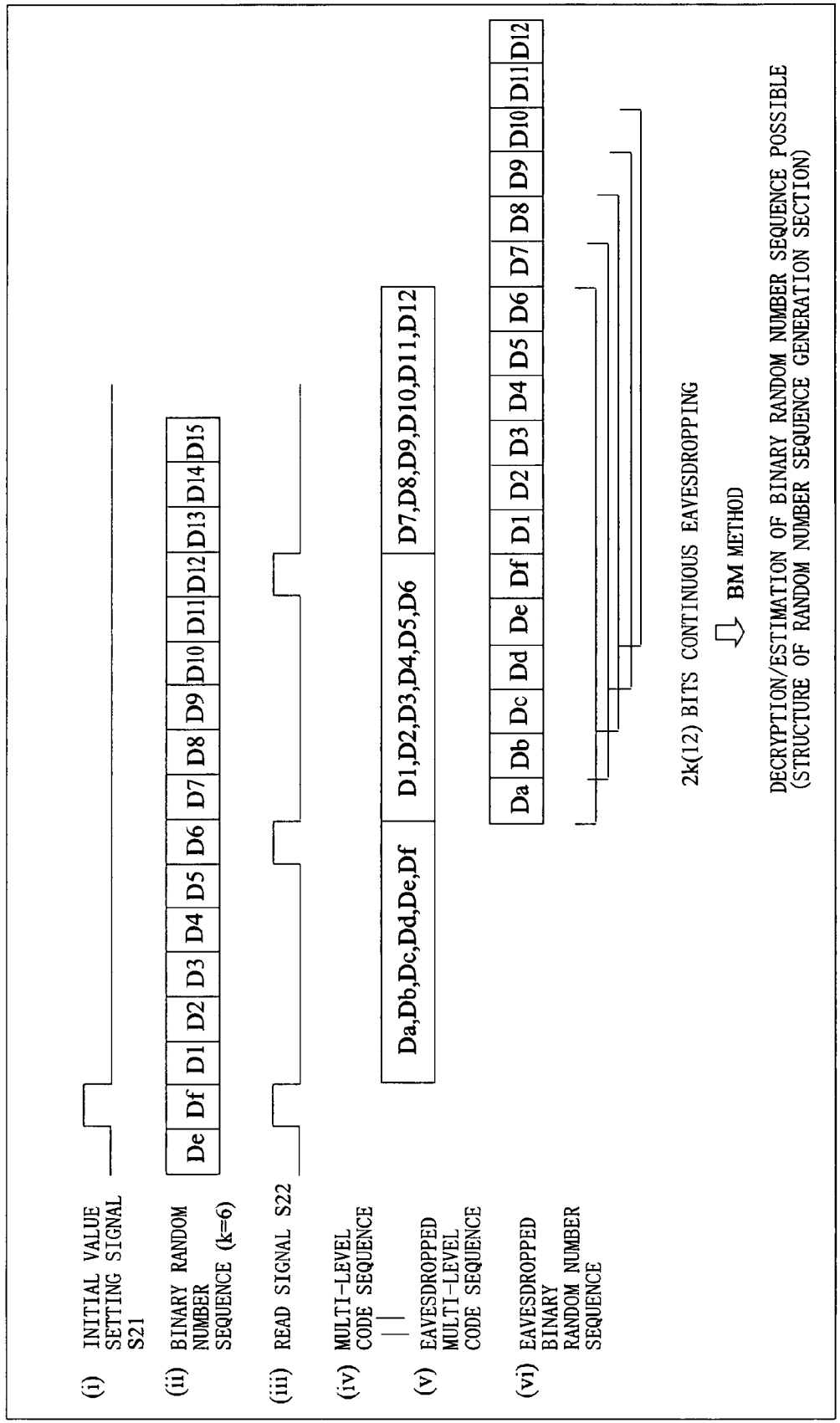

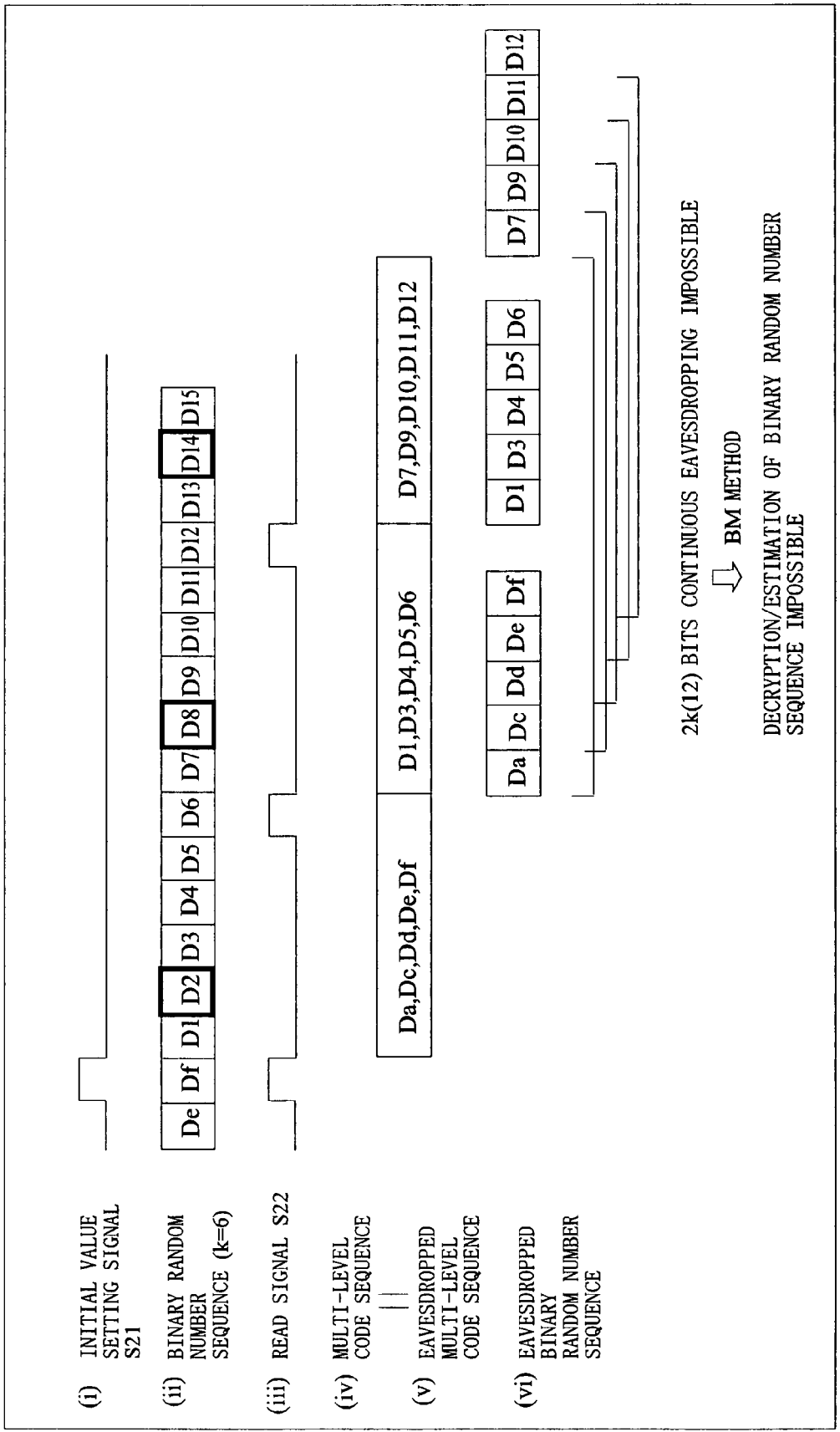

DATA TRANSMITTER AND DATA RECEIVER

BACKGROUND OF THE INVENTION

1. Field of the Invention

The present invention relates to apparatuses for performing secret communication in order to prevent illegal eavesdropping and interception by a third party. More particularly, the present invention relates to apparatuses for performing data communication through selecting and setting a specific encoding/decoding (modulating/demodulating) method between a legitimate transmitter and a legitimate receiver.

2. Description of the Background Art

Conventionally, in order to perform secret communication between specific parties, there has been adopted a structure for realizing secret communication by sharing original information (key information) for encoding/decoding between transmitting and receiving ends and by performing, based on the original information, an operation/inverse operation on information data (plaintext) to be transmitted, in a mathematical manner. FIG. 21 is a block diagram showing a structure of a conventional data communication apparatus based on the above-described structure. In FIG. 21, the conventional data communication apparatus has a structure in which a data transmitting apparatus 90001 and a data receiving apparatus 90002 a connected to each other via a transmission line 913. The data transmitting apparatus 90001 includes an encoding section 911 and a modulator section 912. The data receiving apparatus 90002 includes a demodulator section 914 and a decoding section 915.

The data transmitting apparatus 90001 and the data receiving apparatus 90002 previously share, with each other, first key information 91 and second key information 96 which have a common content. Here, information data 90 and the first key information 91 are inputted to the encoding section 911, and the second key information 96 is inputted to the decoding section 915, whereby the information data 98 is outputted from the decoding section 915. Further, for the sake of describing eavesdropping by a third party, FIG. 21 includes an eavesdropper's data receiving apparatus 90003 which containing an eavesdropper's demodulator section 916 and an eavesdropper's decoding section 917. Third key information 99, which is different from the first key information 91 and the second key information 96, is inputted to the eavesdropper's decoding section 917. Hereinafter, with reference to FIG. 21, an action of the conventional data communication apparatus will be described.

In the data transmitting apparatus 90001, the encoding section 911 encodes (encrypts) the information data 90 in accordance with the first key information 91. The modulator section 912 converts the information data encrypted by the encoding section 911 into a modulated signal 94 in a predetermined modulation method and transmits the modulated signal 94 to the transmission line 913. In the data receiving apparatus 90002, the demodulator section 914 demodulates, in a predetermined demodulation method, the modulated signal 94 which is transmitted via the transmission line 913. The decoding section 915, based on the second key information 96, decodes (decrypts) a signal demodulated by the demodulator section 914, thereby outputting information data 98.

Next, an action of the eavesdropper's data receiving apparatus 90003, in the case of the eavesdropping of the modulated signal 94 transmitted between the data transmitting apparatus 90001 and the data receiving apparatus 90002, will be described. In the eavesdropper's data receiving apparatus 90003, the eavesdropper's demodulator section 916 demodulates, in the predetermined demodulation method, the modulated signal 94 which is transmitted via the transmission line 913. The eavesdropper's decoding section 917 attempts, based on the third key information 99, decoding of a signal demodulated by the eavesdropper's demodulator section 916. Here, since the eavesdropper's decoding section 917 attempts, based on the third key information 99 which is different from the first key information 91, the decoding of the signal demodulated by the eavesdropper's demodulator section 916, the original information data 90 cannot be reproduced accurately. That is, since the eavesdropper's decoding section 917 does not share correct key information with the data transmitting apparatus 90001, the original information data 90 cannot be reproduced appropriately.

A mathematical encryption (or also referred to as a computational encryption or a software encryption) technique based on such mathematical operation maybe applicable to an access system described in Japanese Laid-Open Patent Publication No. 9-205420 (hereinafter referred to as patent document 1), for example. Patent document 1 discloses an access system having a PON (Passive Optical Network) constitution in which an optical signal transmitted from an optical transmitter is divided by an optical coupler, and distributed to optical receivers at a plurality of optical subscribers' houses. In the above-described access system, such optical signals that are not desired and aimed at another subscribers are inputted to each of the optical receivers. Therefore, each of the optical receivers encrypts the information data aimed at each of the subscribers by using key information which is different by the subscribers, thereby preventing a leakage/eavesdropping of the information data between the subscribers and realizing safe data communication.

The mathematical encryption technique is described in "Cryptography and Network Security: Principles and Practice" translated by Keiichiro Ishibashi et al., Pearson Education, 2001 (hereinafter referred to as non-patent document 1) and "Applied Cryptography" translated by Mayumi Adachi et al., Softbank publishing, 2003(hereinafter referred to as non-patent document 2).

However, in the case of the conventional data communication apparatus based on the mathematical encryption technique, it is theoretically possible for the eavesdropper to decrypt, even if the eavesdropper does not share the key information, a cipher text (a modulated signal or encrypted information data) by means of an all possible attack executing operations which use all possible combinations of key information, or by means of a special analysis algorithm. Particularly, improvement in processing speed of a computer has been remarkable in recent years, and thus there has been a problem in that if a new computer based on a novel principle such as a quantum computer is realized in the future, it is possible to eavesdrop on the cipher text easily within finite lengths of time.

SUMMARY OF THE INVENTION

Therefore, an object of the present invention is to provide a data communication apparatus which causes the eavesdropper to take a significantly increased time to analyze the cipher text and provides high concealability.

The present invention is directed to the data transmitting apparatus for encrypting information data by using a predetermined key information and performing secret communication with a receiving apparatus. To attain the above-described objects, the data transmitting apparatus of the present invention comprises: a multi-level code generation section for generating, based on the predetermined key information, a multi-level code sequence in which a signal level changes so as to be approximately random numbers; a multi-level processing section for combining the multi-level code sequence and the information data and generating a multi-level signal having a plurality of levels corresponding to a combination of the multi-level code sequence and the information data ; and a modulator section for treating the multi-level signal with predetermined modulation processing and generating a modulated signal. The multi-level code generation section generates the multi-level code sequence in accordance with a changed random number sequence which results from changing a bit series of a binary random number sequence generated based on the predetermined key information.

Preferably, the multi-level code generation section includes: a random number sequence generation section for generating the binary random number sequence, which is a pseudo-random number sequence, based on the predetermined key information; a bit selection section for selecting an intended bit series from the binary random number sequence generated by the random number sequence generation section and outputting the selected bit series as the changed random number sequence; and a multi-level conversion section for converting the changed random number sequence into the multi-level code sequence.

Preferably, the multi-level code generation section further includes a random number generation section for generating a pseudo-random number sequence. In this case, the bit selection section changes, based on the pseudo-random number sequence generated by the random number generation section, the bit series selected from the binary random number sequence generated by the random number sequence generation section.

Further, the multi-level code generation section may include: a random number sequence generation section for generating the binary random number sequence, which is a pseudo-random number sequence, based on the predetermined key information; and a multi-level conversion section for setting a remaining bit series, after subtracting a previously fixed predetermined bit series from the binary random number sequence generated by the random number sequence generation section, as the changed random number sequence, and for converting the changed random number sequence into the multi-level code sequence.

Further, the multi-level code generation section may include: a random number sequence generation section for generating the binary random number sequence, which is a pseudo-random number sequence, based on the predetermined key information; and a multi-level conversion section for converting the binary random number sequence generated by the random number sequence generation section into the multi-level code sequence. In this case, the multi-level conversion section treats, by acting asynchronously to the random number sequence generation section, the binary random number sequence generated by the random number sequence generation section as the changed random number sequence.

Further, the multi-level code generation section may include: a random number sequence generation section for generating the binary random number sequence, which is a pseudo-random number sequence, based on the predetermined key information; a bit shuffling section for outputting a bit series of the binary random number sequence, which is generated by the random number sequence generation section, after changing an order of the binary random number sequence, as the changed random number sequence; and a multi-level conversion section for converting the changed random number sequence into the multi-level code sequence.

Preferably, the multi-level code generation section further includes a random number generation section for generating a pseudo-random number sequence. In this case, the bit shuffling section determines a regulation for shuffling the binary random number sequence generated by the random number sequence generation section, in accordance with the pseudo-random number sequence generated by the random number generation section.

Further, the multi-level code generation section may include: a random number sequence generation section for generating the binary random number sequence, which is a pseudo-random number sequence, based on the predetermined key information; a memory section for storing the binary random number sequence generated by the random number sequence generation section; and a multi-level conversion section for converting the binary random number sequence read from the memory section into the multi-level code sequence. In this case, the multi-level conversion section treats, by changing a read address of the memory section, the binary random number sequence generated by the random number sequence generation section as the changed random number sequence.

Preferably, the random number sequence generation section is constituted of a linear feedback shift register including a plurality of shift registers and an exclusive OR element. Further, the multi-level conversion section includes a plurality of latches and a D/A conversion section which converts a bit series outputted from the plurality of latches into the multi-level code sequence.

Further the present invention is directed to a data receiving apparatus for receiving information data encrypted by using predetermined key information and performing secret communication with a transmitting apparatus. To attain the above-described object, the data receiving apparatus of the present invention comprises: a multi-level code generation section for generating, based on the predetermined key information, a multi-level code sequence in which a signal level changes so as to be approximately random numbers; a demodulator section for demodulating, in a predetermined demodulation method, a modulated signal received from the transmitting apparatus so as to be outputted as a multi-level signal having a plurality of levels corresponding to a combination of the information data and the multi-level code sequence; and an identification section for identifying, based on the multi-level code sequence, the information data from the multi-level signal. The multi-level code generation section generates the multi-level code sequence in accordance with a changed random number sequence which results from changing a bit series of a binary random number sequence generated based on the predetermined key information.

Further, processing procedures performed by the above-described data transmitting apparatus can be considered as a data transmitting method for encrypting information data by using predetermined key information and performing secret communication with a receiving apparatus. That is, the data transmitting method comprises: a multi-level code generating step of generating, based on the predetermined key information, a multi-level code sequence in which a signal level changes so as to be approximately random numbers; a multi-level processing step of combining the multi-level code sequence and the information data and generating a multi-level signal having a plurality of levels corresponding to a combination of the multi-level code sequence and the information data; and a modulating step of generating a modulated signal by treating the multi-level signal with predetermined modulating processing, wherein the multi-level code generation step generates the multi-level code sequence in accordance with a changed random number sequence which results from changing a bit series of a binary random number sequence generated based on the predetermined key information.

Further, processing procedures performed by the above-described data receiving apparatus can be considered as a data receiving method for receiving information data encrypted by using predetermined key information and performing secret communication with a transmitting apparatus. That is, the data receiving method comprises: a multi-level code generating step of generating, based on the predetermined key information, a multi-level code sequence in which a signal level changes so as to be approximately random numbers; a demodulating step of demodulating, in a predetermined demodulation method, a modulated signal received from the transmitting apparatus so as to be outputted as a multi-level signal having a plurality of levels corresponding to a combination of the information data and the multi-level code sequence; and an identification step of identifying, based on the multi-level code sequence, the information data from the multi-level signal, wherein the multi-level code generation section generates the multi-level code sequence in accordance with a changed random number sequence which results from changing a bit series of a binary random number sequence generated based on the predetermined key information.

According to the data transmitting apparatus of the present invention, when the information data to be transmitted is encoded as a multi-level signal, an interval between signal levels of the multi-level signal is set appropriately with respect to a noise level included in a receiving signal, whereby quality of the receiving signal at the time of eavesdropping by a third party is crucially deteriorated, and decryption/decoding of the multi-level signal by the third party is caused to be difficult. Further, even if the cipher text is obtained by the third party, a multi-level key is generated such that the key information is not estimated easily, whereby it is possible to provide easily a further safe data communication apparatus. Further, the data receiving apparatus includes a multi-level code generation section which is similar to that of the data transmitting apparatus, thereby easily obtaining the information data from the modulated signal received from the data transmitting apparatus.

These and other objects, features, aspects and advantages of the present invention will become more apparent from the following detailed description of the present invention when taken in conjunction with the accompanying drawings.

BRIEF DESCRIPTION OF THE DRAWINGS

FIG. 12A is a diagram explaining eavesdropping by a third party on the data communication apparatus according to the sixth embodiment of the present invention.

FIG. 12B is a diagram explaining an effect of the data communication apparatus according to the sixth embodiment of the present invention.

DESCRIPTION OF THE PREFERRED EMBODIMENTS

First Embodiment

Figure 1:
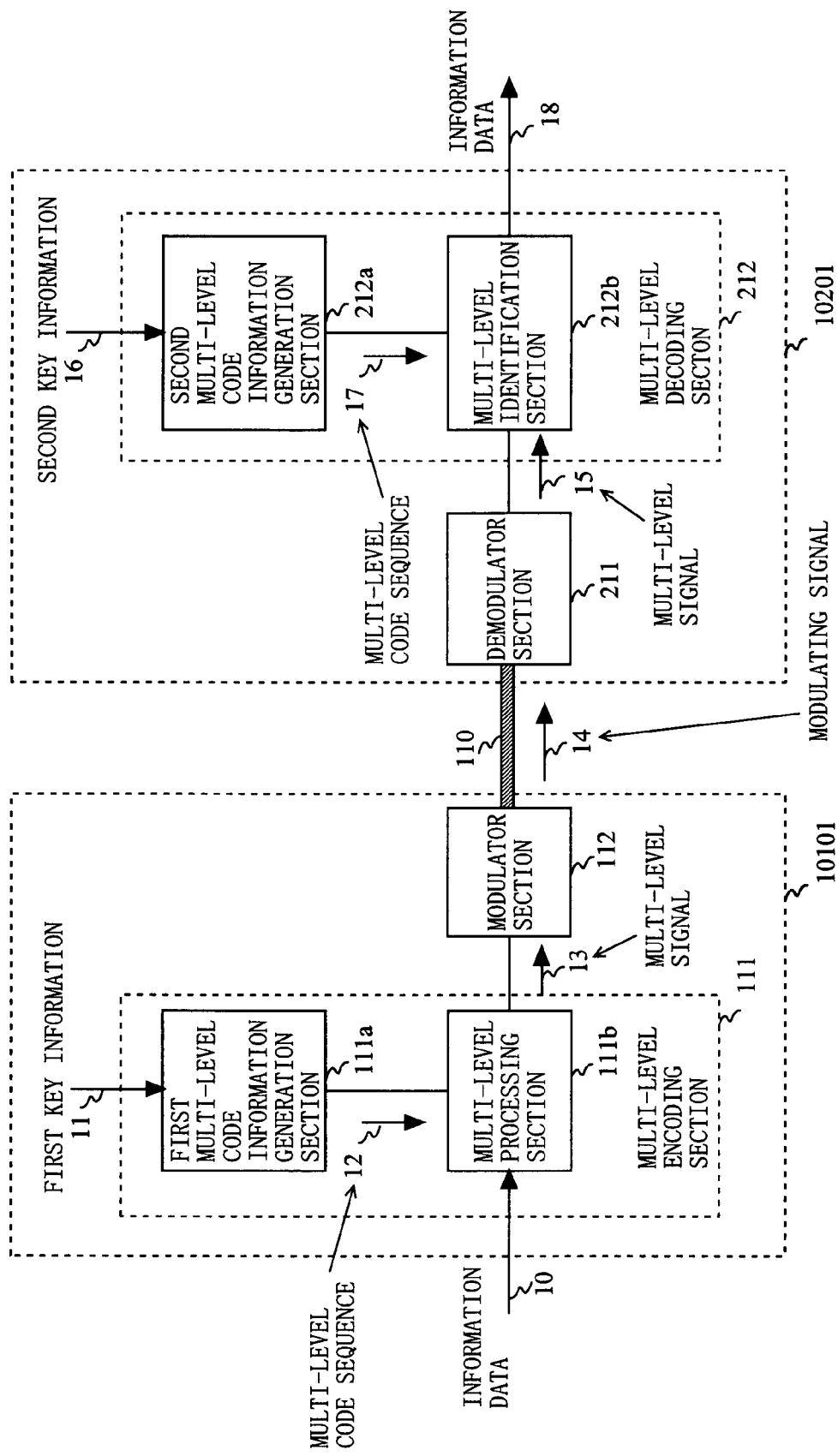
FIG. 1 is a block diagram showing an example of a constitution of a data communication apparatus according to a first embodiment of the present invention.

FIG. 1 is a block diagram showing an example of a constitution of a data communication apparatus according to a first embodiment of the present invention. In FIG. 1, the data communication apparatus according to the first embodiment has a constitution in which a data transmitting apparatus 10101 and a data receiving apparatus 10201 are connected to each other via a transmission line 110. The data transmitting apparatus 10101 has a multi-level encoding section 111 and a modulator section 112. The multi-level encoding section 111 includes a first multi-level code generation section 111a and a multi-level processing section 111b. The data receiving apparatus 10201 has a demodulator section 211 and a multi-level decoding section 212. The multi-level decoding section 212 includes a second multi-level code generation section 212a and a multi-level identification section 212b. A metal line such as a LAN cable or a coaxial line, or an optical waveguide such as an optical-fiber cable can be used as the transmission line 110. Further the transmission line 110 is not limited to a wired cable such as the LAN cable, but can be free space which enables a wireless signal to be transmitted.

Figure 2:
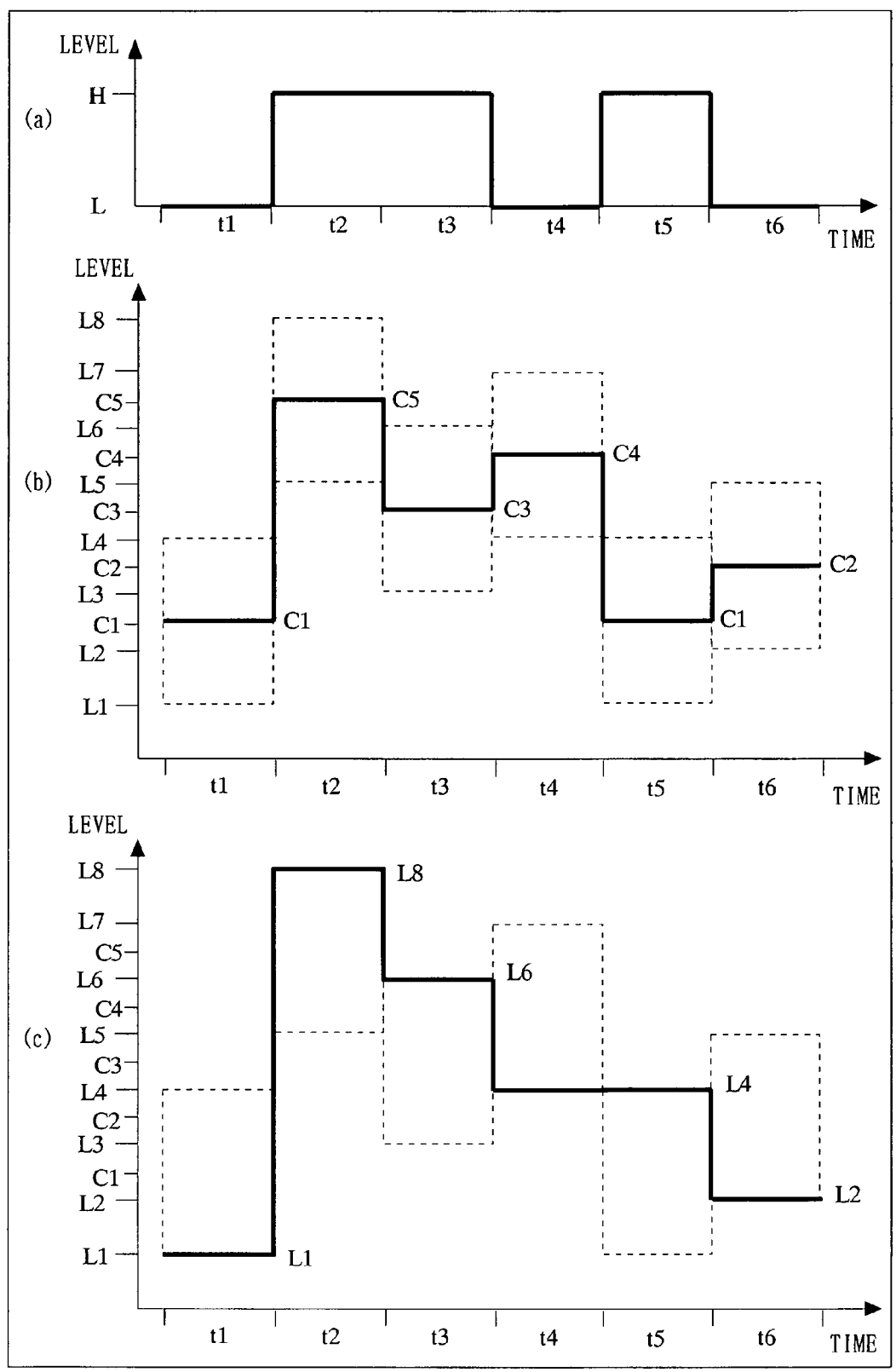
FIG. 2 is a diagram explaining waveforms of a transmission signal of the data communication apparatus according to the first embodiment of the present invention.
Figure 3:
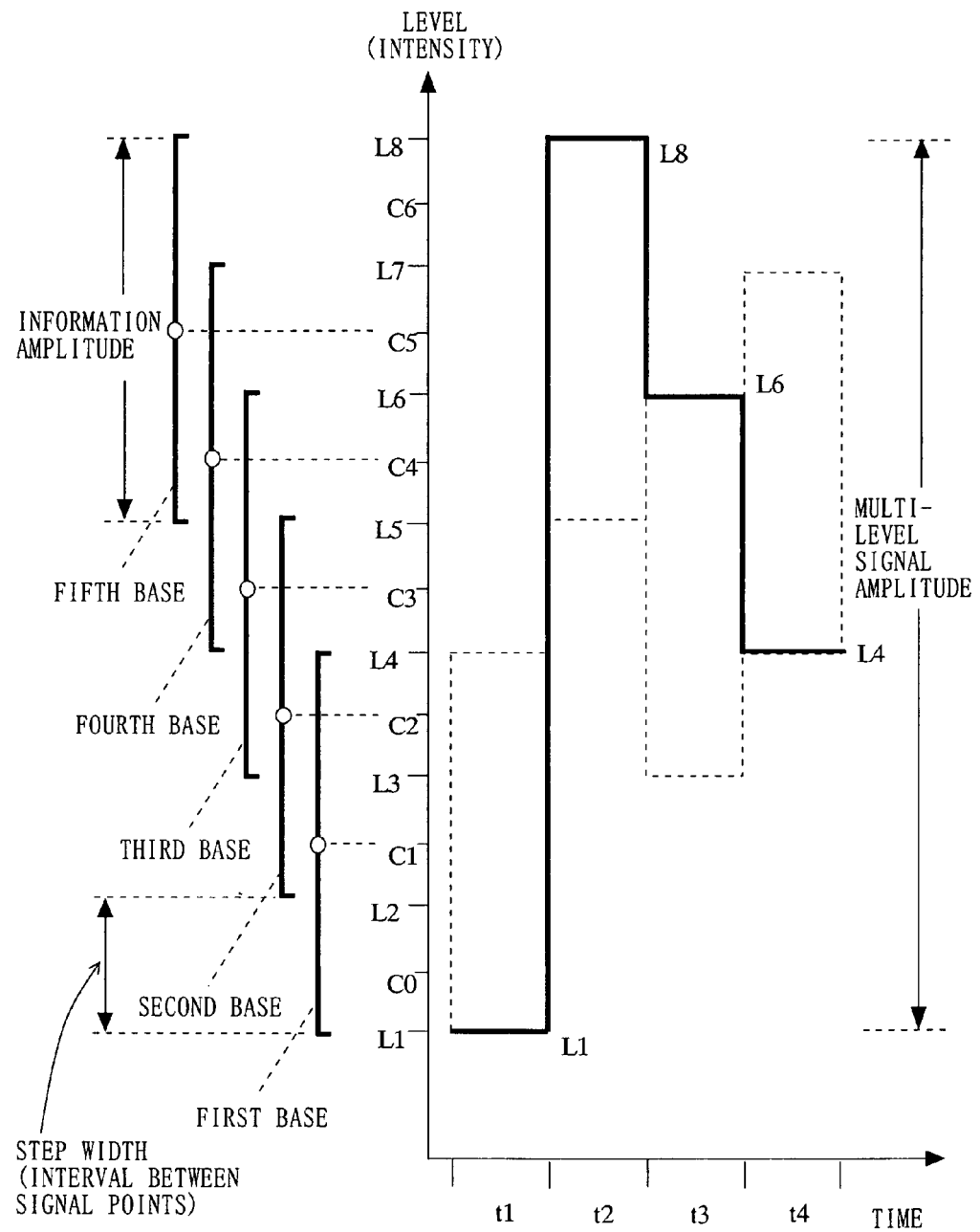
FIG. 3 is a diagram explaining names of the waveforms of the transmission signal of the data communication apparatus according to the first embodiment of the present invention.
Figure 4:
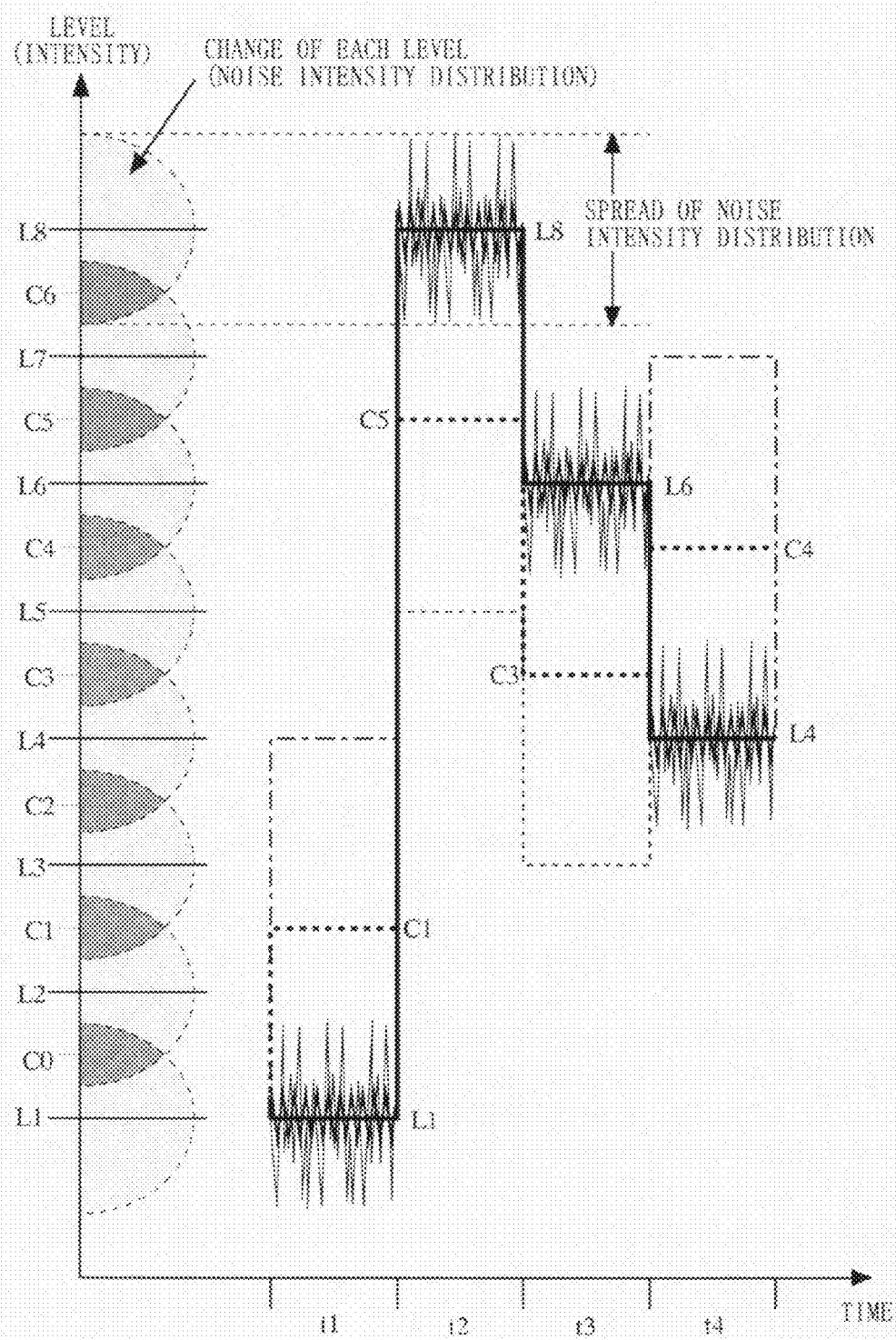
FIG. 4 is a diagram explaining quality of the transmission signal of the data communication apparatus according to the first embodiment of the present invention.

FIG. 2 is a diagram explaining waveforms of a transmission signal of the data communication apparatus according to the first embodiment of the present invention. FIG. 3 is a diagram explaining names of the waveforms of the transmission signal of the data communication apparatus according to the first embodiment of the present invention. FIG. 4 is a diagram explaining quality of the transmission signal of the data communication apparatus according to the first embodiment of the present invention. Hereinafter, with reference to FIGS. 1 to 4, an action of the data communication apparatus according to the first embodiment of the present invention will be described.

The first multi-level code generation section 111a generates, based on predetermined first key information 11, a multi-level code sequence 12 (FIG. 2(b)) in which a signal level changes so as to be approximately random numbers. The multi-level processing section 111b inputs the multi-level code sequence 12 (FIG. 2(b)) and information data 10 (FIG. 2(a)), combines the both signals in accordance with a predetermined procedure, and generates a multi-level signal 13 (FIG. 2(c)) having a plurality of levels corresponding to a combination of the multi-level code sequence 12 and the information data 10. For example, in the case where a level of the multi-level code sequence 12 changes to c1/c5/c3/c4 with respect to time slots t1/t2/t3/t4, the multi-level processing section 111a generates the multi-level signal 13 in which a signal level changes to L1/L8/L6/L4 by using the multi-level code sequence 12 as a bias level and adding thereto the information data 10.

Here, as shown in FIG. 3, an amplitude of the information data 10 is referred to as an "information amplitude", a total amplitude of the multi-level signal 13 is referred to as a "multi-level signal amplitude", pairs of levels (L1,L4)/(L2,L5)/(L3,L6)/(L4,L7)/(L5,L8) which the multi-level signal 13 may take corresponding to the levels of the multi-level code sequence 12 c1/c2/c3/c4/c5 are respectively referred to as a first to a fifth "bases", and a minimum interval between signal levels of the multi-level signal 13 is referred to as a "step width".

The modulator section 112 modulates the multi-level signal 13 in a predetermined modulation method and transmits the same as a modulated signal 14 to the transmission line 110. The demodulator section 211 demodulates the modulated signal 14 transmitted via the transmission line 110, and reproduces a multi-level signal 15. The second multi-level code generation section 212a previously shares second key information 16 which has the same content as the first key information 11, and based on the second key information 16, generates a multi-level code sequence 17 which corresponds to the multi-level code sequence 12. The multi-level identification section 212b identifies the multi-level signal 15 (binary determination) by using the multi-level code sequence 17 as a threshold, and reproduces information data 18. Here, the modulated signal 14, which is of the predetermined modulation method and is transmitted/received by the modulator section 112 and the demodulator section 211 via the transmission line 110, is a signal obtained by modulating an electromagnetic wave (electromagnetic field) or an optical wave using the multi-level signal 13.

Note that the multi-level processing section 111b may generate the multi-level signal 13 by using any methods, in addition to a method of generating the multi-level signal 13 by adding the information data 10 and the multi-level code sequence 12 as above described. For example, the multi-level processing section 111b may generate, based on the information data 10, the multi-level signal 13, by modulating an amplitude of the levels of the multi-level code sequence 12. Alternatively, the multi-level processing section 111b may generate the multi-level signal 13 by reading out consecutively, from a memory having levels of the multi-level signal 13 stored therein, the levels of the multi-level signal 13, which are corresponding to the combination of the information data 10 and the multi-level code sequence 12.

Further, in FIG. 2 and FIG. 3, the levels of the multi-level signal 13 are represented as 8 levels, but the levels of the multi-level signal 13 are not limited to the representation. Further, the information amplitude is represented as three times or integer times of the step width of the multi-level signal 13, but the information amplitude is not limited to the representation. The information amplitude may be any integer times of the step width of the multi-level signal 13, or is not necessarily the integer times thereof. Further, in this regard, in FIG. 2 and FIG. 3, each of the levels of the multi-level code sequence 12 (each of the bias levels) is located so as to be at an approximate center between each of the levels of the multi-level signal 13, but each of the levels of the multi-level code sequence 12 is not limited to such location. For example, each of the levels of the multi-level code sequence 12 is not necessarily at the approximate center between each of the levels of the multi-level signal 13, or may coincide with each of the levels of the multi-level signal 13. Further, the above description is based on an assumption that the multi-level code sequence 12 and the information data 10 are identical in a change rate to each other and also in a synchronous relation, but the multi-level code sequence 12 and the information data 10 may be in an asynchronous relation, or the change rate of either thereof may be faster (or slower) than the change rate of another.

Next, an action of eavesdropping by a third party will be described. It is assumed that the third party, who is an eavesdropper, decodes the modulated signal 14 by using a constitution corresponding to the data receiving apparatus 10201 held by a legitimate receiving party or a further sophisticated data receiving apparatus (i.e. eavesdropper's data receiving apparatus). The eavesdropper's data receiving apparatus reproduces the multi-level signal 15 by demodulating the modulated signal 14. However, the eavesdropper's data receiving apparatus does not share the key information with the data transmitting apparatus 10101, and thus, unlike the data receiving apparatus 10201, the eavesdropper's data receiving apparatus cannot generate the multi-level code sequence 17 based on the key information. Therefore, the eavesdropper's data receiving apparatus cannot perform binary determination of the multi-level signal 15 by using the multi-level code sequence 17 as a reference.

As an action of the eavesdropping which may be possible under these circumstances, there is a method of identifying the multi-level signal 15 by specifying the levels of the multi-level signal 15 using a threshold corresponding to all the levels of the multi-level signal 15 as the reference. That is, the eavesdropper's data receiving apparatus, performs simultaneous determination of the multi-level signal 15 by preparing the threshold corresponding to all possible intervals between the signal levels which the multi-level signal 15 may take, and attempts extraction of correct key information or information data by analyzing a result of the simultaneous determination. For example, the eavesdropper's data receiving apparatus sets all the levels c0/c1/c2/c3/c4/c5/c6 of the multi-level code sequence 12 shown in FIG. 2 as the threshold, and performs the multi-level determination of the multi-level signal 15, thereby attempting the extraction of the correct key information and information data.

However, in an actual transmission system, a noise occurs due to various factors, and the noise is overlapped on the modulated signal 14, whereby the levels of the multi-level signal 15 fluctuates temporally/instantaneously as shown in FIG. 4. In this case, a SN ratio (a signal-to-noise intensity ratio) of a signal (the multi-level signal 15), which is to be determined by the legitimate receiving party (that is, the data receiving apparatus 10201), is determined based on a ratio of the information amplitude of the multi-level signal 15 to the noise level. On the other hand, the SN ratio of the signal (the multi-level signal 15), which is to be determined by the eavesdropper's data receiving apparatus, is determined based on a ratio of the step width of the multi-level signal 15 to the noise level.

Therefore, in the case where a condition of the noise level contained in the signal to be determined is fixed, the SN ratio of the signal to be determined by the eavesdropper's data receiving apparatus is relatively smaller than that by the legitimate data receiving apparatus, and thus a transmitting feature (an error rate) of the eavesdropper's data receiving apparatus deteriorates. That is, the data communication apparatus of the present invention causes a decoding attack by the third party using all the thresholds to induce an identification error, thereby causing the eavesdropping to be difficult. Particularly, in the case where the step width of the multi-level signal 15 is set equal to or smaller than a noise amplitude (spread of a noise intensity distribution), the data communication apparatus substantially disables the multi-level determination by the third party, thereby realizing an ideal eavesdropping prevention.

As the noise to be overlapped on the signal to be determined (the multi-level signal 15 or the modulated signal 14), a thermal noise (Gaussian noise) generated by a space field or an electronic device, etc. may be used, in the case where an electromagnetic wave such as a wireless signal is used as the modulated signal 14, and a photon number distribution (quantum noise) which is generated when a photon is generated or detected, may be used in addition to the thermal noise, in the case where the optical wave is used. More particularly, signal processing such as recording and replication is not applicable to a signal including the quantum noise, and thus the step width of the multi-level signal 15 is set by using the quantum noise level as a reference, thereby disabling the eavesdropping by the third party and securing an absolute safety of the data communication.

As above described, according to the first embodiment of the present invention, when the information data 10 to be transmitted is encoded as the multi-level signal 13, the interval between the signal levels of the multi-level signal 13 is set appropriately with respect to the noise level included in the receiving signal, whereby quality of the receiving signal at the time of the eavesdropping by the third party is crucially deteriorated, and it is possible to provide a further safe data communication apparatus which causes decryption/decoding of the multi-level signal by the third party to be difficult.

Second Embodiment

Figure 5:
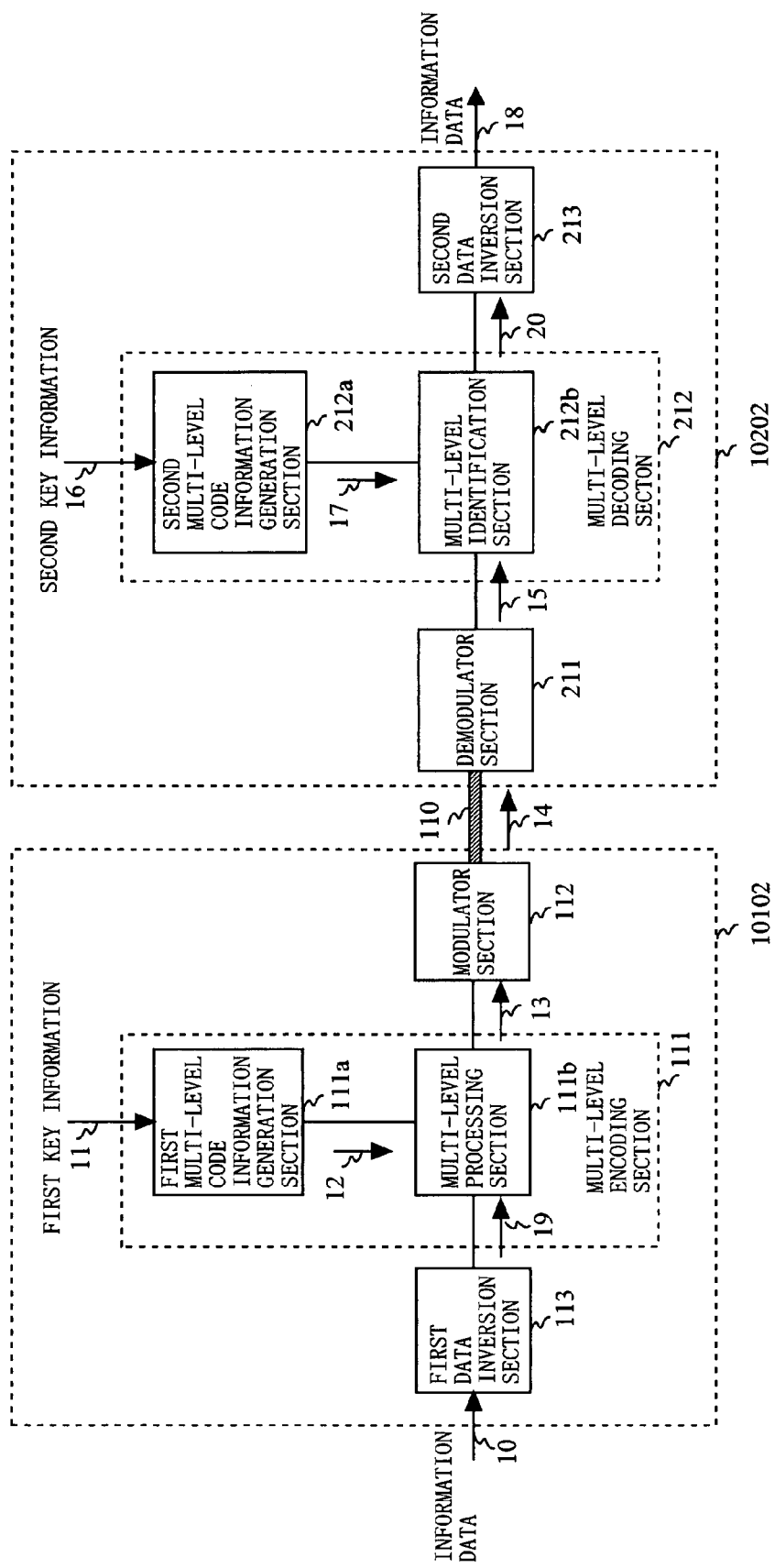
FIG. 5. is a block diagram showing an example of a constitution of a data communication apparatus according to a second embodiment of the present invention.

FIG. 5. is a block diagram showing an example of a constitution of a data communication apparatus according to a second embodiment of the present invention. In FIG. 5, the data communication apparatus according to the second embodiment of the present invention is different, compared to the data communication apparatus (FIG. 1) of the first embodiment, in that a data transmitting apparatus 10102 further includes a first data inversion section 113 and a data receiving apparatus 10202 further includes a second data inversion section 213. Hereinafter, the data communication apparatus according to the second embodiment will be described. Note that the constitution of the present embodiment is based on the first embodiment (FIG. 1), and thus, with regard to blocks which performs the same actions as those of the first embodiment, common reference characters are provided, and description thereof will be omitted.

The first data inversion section 113 does not fix a correspondence relation between "0/1" and "Low/High" included in the information data 10 shown in FIG. 2(a), but changes the correspondence relation approximately at random in accordance with a predetermined procedure. For example, the first data inversion section 113 performs an exclusive OR between a random number series (pseudo-random number sequence), which is generated based on an initial key shared with the second data inversion section 213, and the information data 10, and outputs a result of the operation to the multi-level encoding section 111. The second data inversion section 213 changes the correspondence relation between the "0/1" and "Low/High" of the data outputted from a multi-level decoding section 212 based on a procedure opposite to that of the first data inversion section 113. For example, the second data inversion section 213 performs the exclusive OR between the random number series, which is generated based on the initial key shared with the first data inversion section 113, and data outputted from the multi-level decoding section 212, and reproduce a result of the operation as information data 18.

As above described, according to the second embodiment of the present invention, the information data 10 to be transmitted is inversed approximately at random, whereby complexity of the multi-level signal 13 as a cipher is increased. Accordingly, it is possible to provide a further safe data communication apparatus which causes decryption/decoding of the multi-level signal by a third party to be difficult.

Third Embodiment

Figure 6:
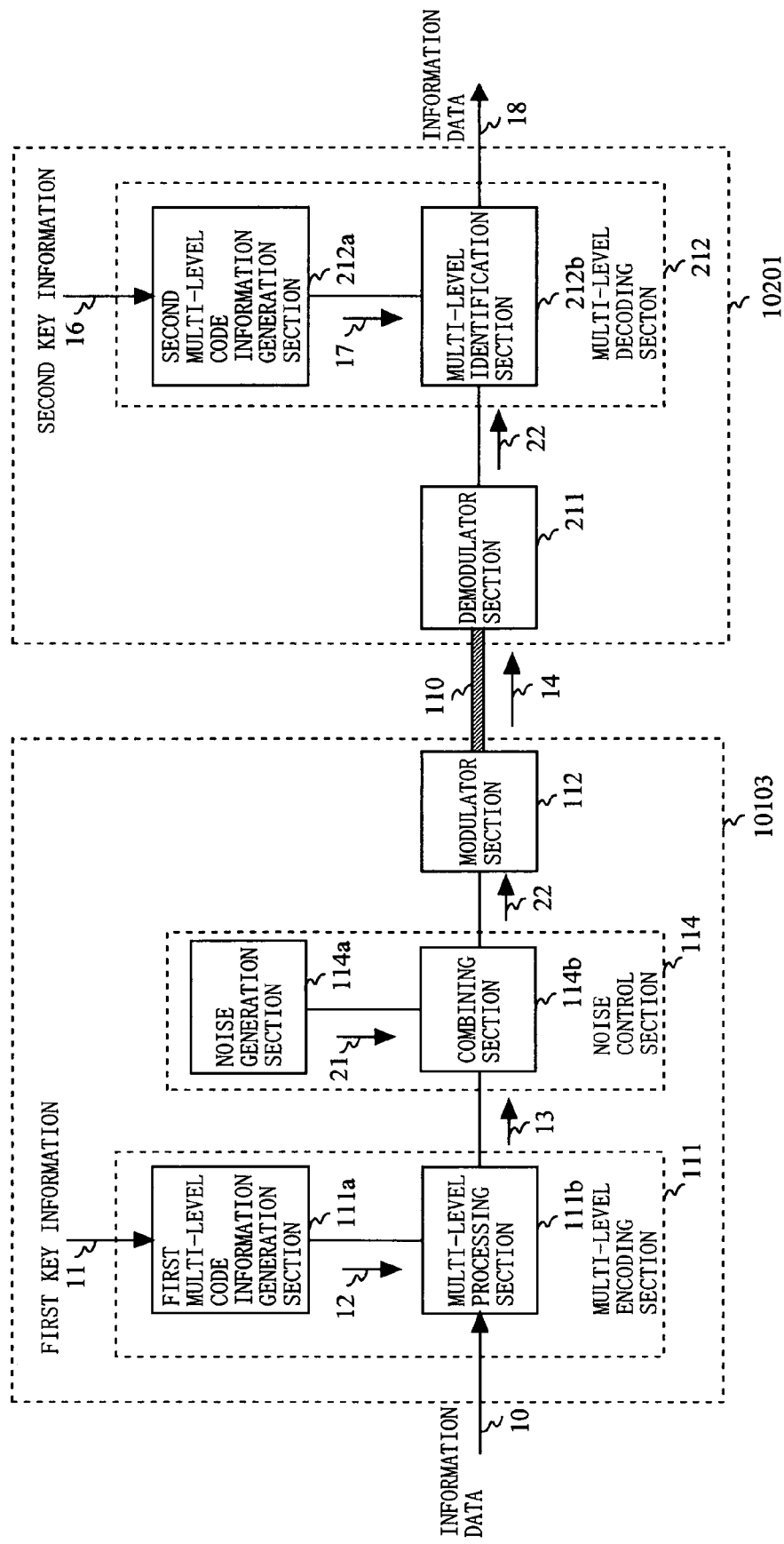
FIG. 6. is a block diagram showing an example of a constitution of a data communication apparatus according to a third embodiment of the present invention.

FIG. 6. is a block diagram showing an example of a constitution of a data communication apparatus according to a third embodiment of the present invention. In FIG. 6, in the case of the data communication apparatus according to the third embodiment of the present invention, compared to the data communication apparatus of the first embodiment (FIG. 1), a data transmitting apparatus 10103 further includes a noise control section 114. The noise control section 114 includes a noise generation section 114a and a combining section 114b. Hereinafter, the data communication apparatus according to the third embodiment of the present invention will be described. Note that a constitution of the present embodiment is based on the first embodiment (FIG. 1), and thus with regard to blocks which performs the same actions as those of the first embodiment, common reference characters are provided, and description thereof will be omitted.

In FIG. 6, the noise generation section 114a generates a predetermined noise 21. The combining section 114b combines the noise generated by the noise generation section 114a with the multi-level signal 13, and outputs, to a modulator section 112, a multi-level signal 22 with which the noise is combined. That is, the noise control section 114 intentionally generates a fluctuation in the levels of the multi-level signal 13 described using FIG. 4, and controls a SN ratio of the multi-level signal 13 at a given value. Note that as the noise generated by the noise generation section 114a, a thermal noise or a quantum noise, etc. will be used. Further, the multi-level signal 22 which the noise is combined with (overlapped on) is referred to as a noise-overlapped multi-level signal 22.

As above described, according to the third embodiment of the present invention, when the information data 10 to be transmitted is encoded as the multi-level signal 13, the SN ratio of the multi-level signal 13 is controlled appropriately, whereby quality of a receiving signal at the time of eavesdropping by a third party is crucially deteriorated, and it is possible to provide a safe data communication apparatus which causes decryption/decoding of the multi-level signal by the third party to be difficult.

Fourth Embodiment

Figure 7:
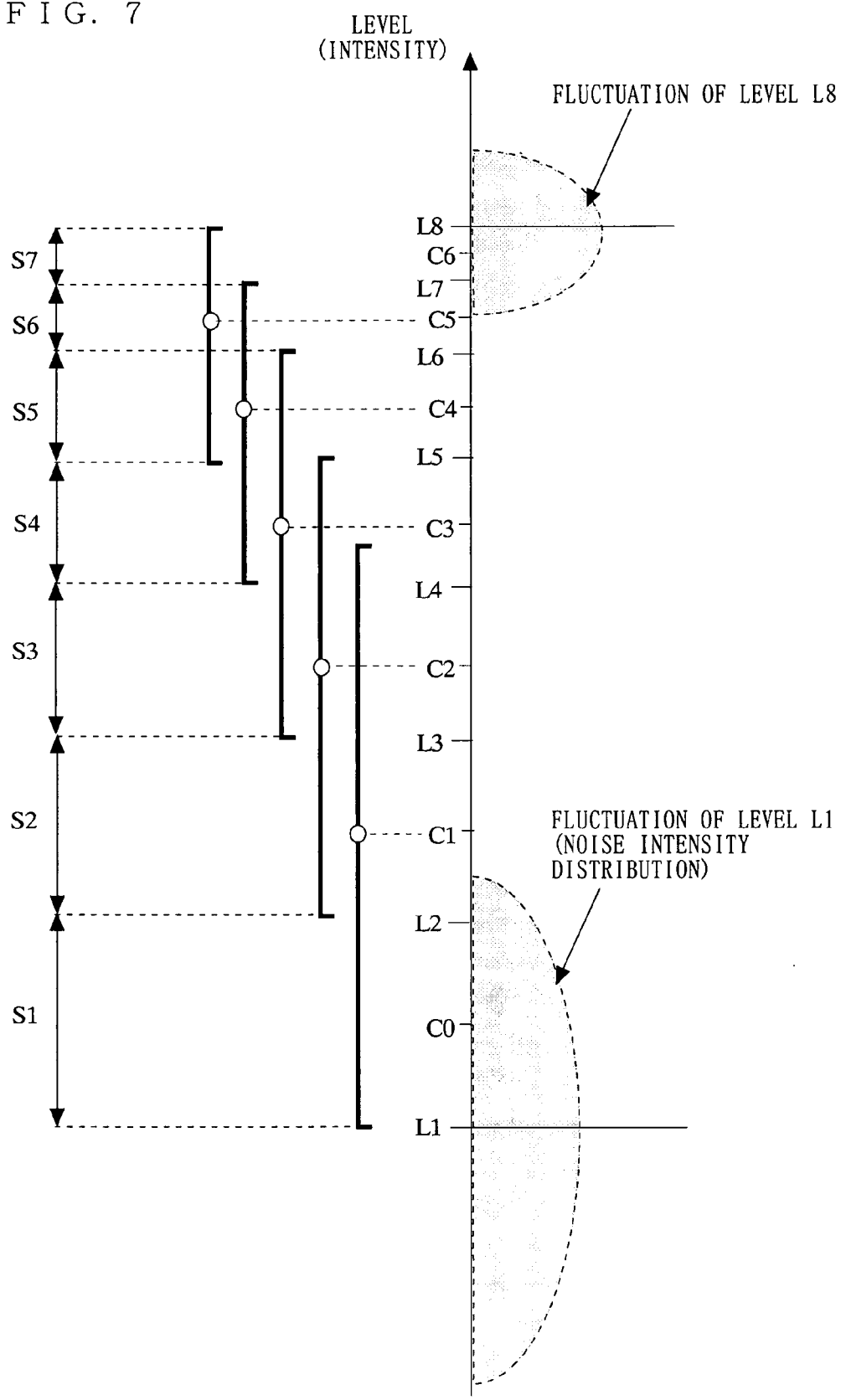
FIG. 7 is a diagram showing an example of a multi-level signal format used in a data communication apparatus according to a fourth embodiment of the present invention.

FIG. 7 is a diagram showing an example of a multi-level signal format used in a data communication apparatus according to a fourth embodiment of the present invention. A constitution of the data communication apparatus according to the fourth embodiment of the present invention is same as those of the first to third embodiments, and thus FIG. 1, FIG. 5 or FIG. 6 will be used additionally. Hereinafter, with reference to FIG. 7, an action of the data communication apparatus according to the fourth embodiment of the present invention will be described.

With reference to FIG. 1, FIG. 5, or FIG. 6, the multi-level encoding section 111 sets, as shown in FIG. 7, respective step widths (S1 to S7) of the multi-level signal 13 in accordance with respective fluctuation levels (i.e. noise intensity distributions overlapped on the respective levels). Specifically, the multi-level encoding section 111 allocates, such that a SN ratio of two adjoining signal levels of a signal to be determined (i.e. multi-level signal 15), which is inputted to multi-level identification section 212b, becomes approximately uniform, an interval of the signal levels. Therefore, the multi-level encoding section 111 uniformly sets each of the step widths in the case where the noise level to be overlapped on each of the levels of the multi-level signal 15 is equal.

Generally, assuming that an optical intensity modulated signal, whose light source is a laser diode (LD), is a modulated signal 14 to be outputted from a modulator section 112, a fluctuation width (noise level) of the modulated signal 14 changes depending on the levels of the multi-level signal 13 inputted to the LD. This results from the fact that the LD emits light based on a principle of stimulated emission which uses a natural emission light as a master light, and the noise level is defined based on a relative ratio of a stimulated emission light level to a natural emission light level. Here, the higher an excitation rate (corresponding to a bias current to be injected into the LD) is, the larger a ratio of the stimulated emission light level becomes, and consequently the noise level becomes small. On the other hand, the lower the excitation rate is, the larger a ratio of the natural emission light level becomes, and consequently the noise level becomes large. Therefore, the multi-level encoding section 111 enlarges the step widths in ranges in which the level of the multi-level signal 13 is small, and reduces the step widths in ranges in which the level of the multi-level signal 13 is large, as shown in FIG. 7. That is, the step widths of the multi-level signal 13 are set in a non-linear manner, whereby it is possible to set the SN ratio of the adjoining signal levels of the signal to be determined in an approximately uniform manner.

Further, even in the case where an optically modulated signal is used as the modulated signal 14, under the condition where the noise caused by the above-described natural emission light or a thermal noise to be used for an optical receiver is sufficiently small, the SN ratio of a receiving signal is determined mainly based on a shot noise. Under such condition, the larger the level of the multi-level signal 13 is, the larger the noise level included in the multi-level signal 15 becomes. Therefore, contrary to a case of FIG. 7, the multi-level encoding section 111 reduces the step widths in the ranges in which the level of the multi-level signal 13 is small, and enlarges the step widths in the ranges in which the level of the multi-level signal 13 is large, whereby it is possible to set the SN ratio of the adjoining signal levels of the signal to be determined in an approximately uniform manner.

As above described, according to the fourth embodiment of the present invention, when the information data 10 to be transmitted is encoded as multi-level signal 13, the interval between the signal levels of the multi-level signal 13 is set such that the SN ratio of the adjoining signal levels of the signal to be determined becomes approximately uniform. Accordingly, quality of a receiving signal at the time of eavesdropping by a third party is crucially deteriorated, whereby it is possible to provide a safe data communication apparatus which causes decryption/decoding of the multi-level signal by the third party to be further difficult.

Fifth Embodiment

Figure 8:
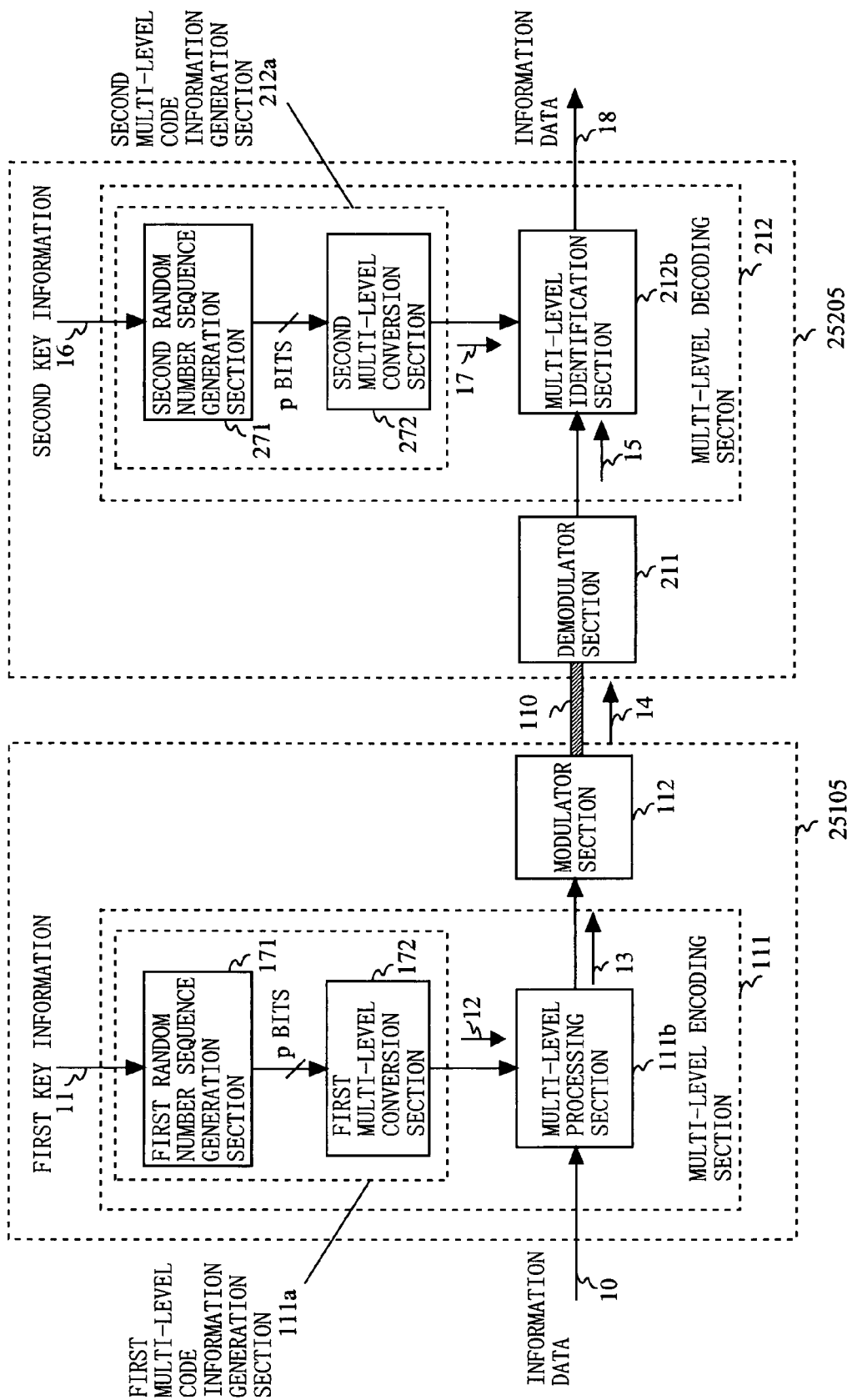
FIG. 8 is a block diagram showing an example of a constitution of a data communication apparatus according to a fifth embodiment of the present invention.

FIG. 8 is a block diagram showing an example of a constitution of a data communication apparatus according to a fifth embodiment of the present invention. In FIG. 8, the data communication apparatus according to the fifth embodiment of the present invention has a constitution in which the data transmitting apparatus 25105 and the data receiving apparatus 25205 are connected to each other via the transmission line 110. The data communication apparatus according to the fifth embodiment is, compared to the data communication apparatuses according to the above-described first to fourth embodiments, characterized by constitutions of a first multi-level code generation section 111a and a second multi-level code generation section 212a. The first multi-level code generation section 111a includes a first random number sequence generation section 171 and a first multi-level conversion section 172. The second multi-level code generation section 212a includes a second random number sequence generation section 271 and a second multi-level conversion section 272.

The first random number sequence generation section 171 generates a predetermined pseudo-random number sequence by using first key information 11 as an initial value. The first multi-level conversion section 172 extracts a p-bit series (p is a given integer) from the pseudo-random number sequence generated by the first random number sequence generation section 171, and converts the same into a multi-level code sequence 12 having levels corresponding to the extracted bit series. In a similar manner, the second random number sequence generation section 271 generates, by using second key information 16 as an initial value, a pseudo-random number sequence which corresponds to the pseudo-random number sequence outputted from the first random number sequence generation. The second multi-level conversion section 272 extracts the p-bit series (p is a given integer) from the pseudo-random number sequence, and converts the same into a multi-level code sequence 17 having levels corresponding to the extracted bit series.

Figure 9:
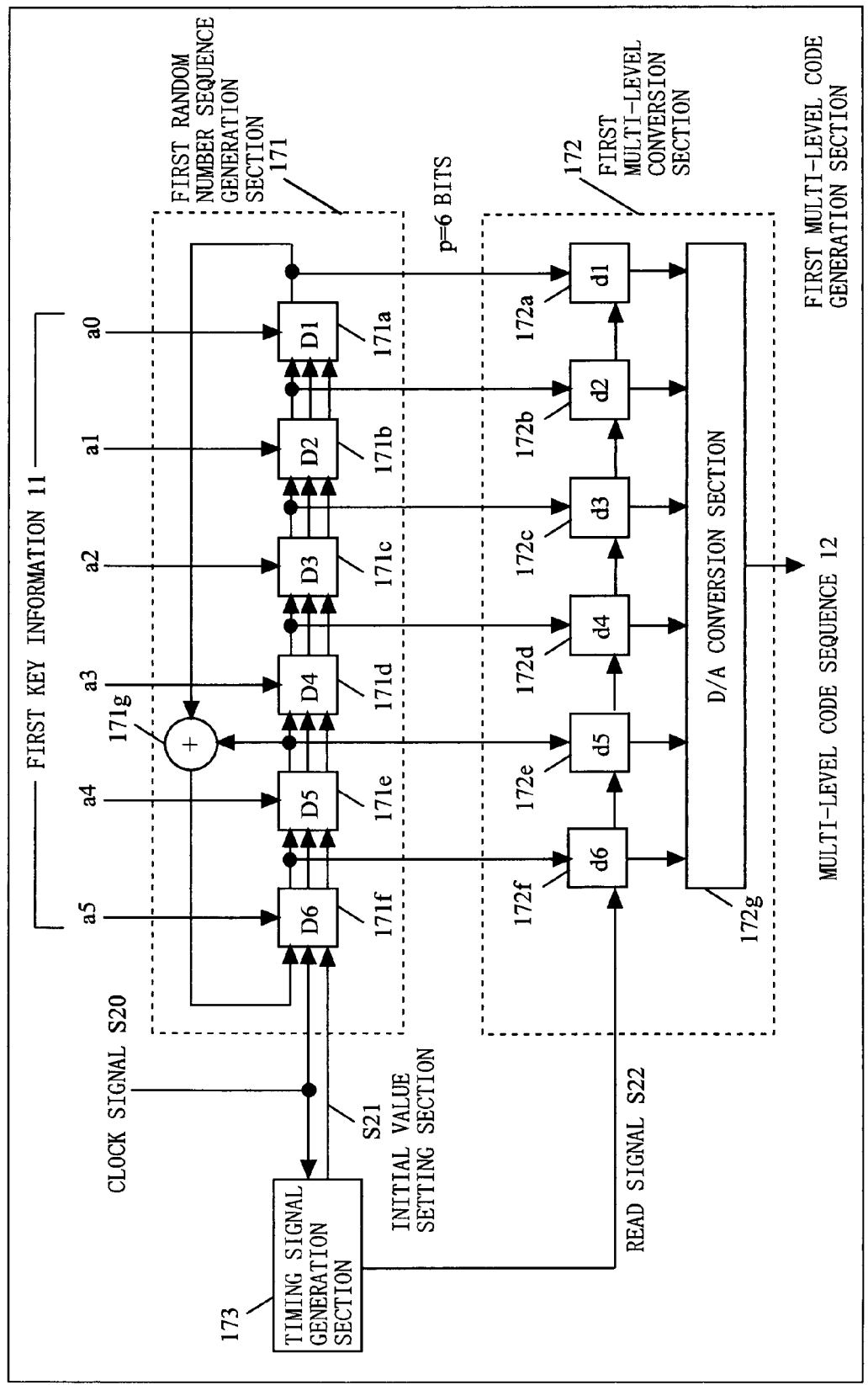
FIG. 9 is a diagram showing an example of a detail constitution of a first multi-level code generation section 111a according to the fifth embodiment of the present invention.

FIG. 9 is a diagram showing an example of a detail constitution of the first multi-level code generation section 111a according to the fifth embodiment of the present invention. Hereinafter, details of the first multi-level code generation section 111a according to the fifth embodiment of the present invention will be described, with reference to FIG. 9. With regard to the second multi-level code generation section 212a, the description thereof will be omitted since a constitution thereof is the same as that of the first multi-level code generation section 111a as shown in FIG. 9.

In FIG. 9, the first multi-level code generation section 111a further includes a timing signal generation section 173 in addition to the first random number sequence generation section 171 and the first multi-level conversion section 172. The timing signal generation section 173 generates an initial value setting signal S21 and a read signal S22 by using a clock signal S20 which is provided externally, as reference timing. The first random number sequence generation section 171 is constituted of, for example, a linear feedback shift register including 6 shift registers 171a to 171f, and one exclusive OR element 171g. In this example, the first random number sequence generation section 171 has the same number of the shift registers 171a to 171f as the bit number of the first key information 11. The first random number sequence generation section 171 sets 6 bits (a0 to a5), which constitutes the first key information 11, to the respectively corresponding shift registers 171a to 171f by using input of the initial value setting signal S21 as a trigger, and generates a binary random number sequence by using the clock signal S20 as the reference timing.

The first multi-level conversion section 172 is, for example, constituted of six latches 172a to 172f and a D/A (digital/analog) conversion section 172g. The first multi-level conversion section 172 extracts a p=6-bit series from the binary random number sequence, which is outputted, at the six latches 172a to 172f, from the first random number sequence generation section 171, by using the input of the read signal S22 as the trigger, and converts at the D/A conversion section 172g, the extracted bit series into the multi-level code sequence 12. Note that, FIG. 9 shows an instantaneous situation in which each of the shift registers 171a to 171f retains and outputs the data D1 to D6, and each of the latches 172a to 172f retains and outputs the data d1 to d6. As a method of converting the bit series into the multi-level code sequence 12 as above, there is, for example, a method in which a 6-bit series (d1 to d6) is converted from binary to decimal-coded form, and then converted into the multi-level code sequence 12 having levels (total level number: $2^6$) corresponding to (equation 1). With regard to a random number generation method/principle based on a constitution of the liner feedback shift register is described in non-patent document 2 and the like, and thus an explanation thereof will be omitted.

$$d6 \times 2^{5+d}5 \times 2^{4+d}4 \times 2^{3+d}3 \times 2^{2+d}2 \times 2^{1+d}1 \qquad \text{(equation 1)}$$

Note that in FIG. 9, as the first random number sequence generation section 171, the constitution of the linear feedback shift register including the six shift registers is shown, however, a number of the shift registers is not limited thereto. Further, the first random number sequence generation section 171 may have any other constitutions than the linear feedback shift register as long as the constitution can cause the first random number sequence generation section 171 to generate the binary random number sequence from the first key information 11. Further, the first multi-level conversion section 172 has a constitution containing six latches, but a number of the latches is not limited thereto. Further, the first multi-level conversion section 172 may have any other constitutional elements than D/A conversion section 172g as long as the constitution of the first multi-level conversion section 172 is capable of converting the binary bit series outputted from the latches into the multi-level code sequence 12.

As above described, according to the fifth embodiment of the present invention, the first multi-level code generation section 111a and the second multi-level code generation section 212a respectively have simple constitutions, and are capable of generating the multi-level code sequences 12, 17. Accordingly, the data communication apparatus according to the fifth embodiment of the present invention can achieve the same effect as the data communication apparatuses according to the first to fourth embodiments.

Sixth Embodiment

Figure 10:
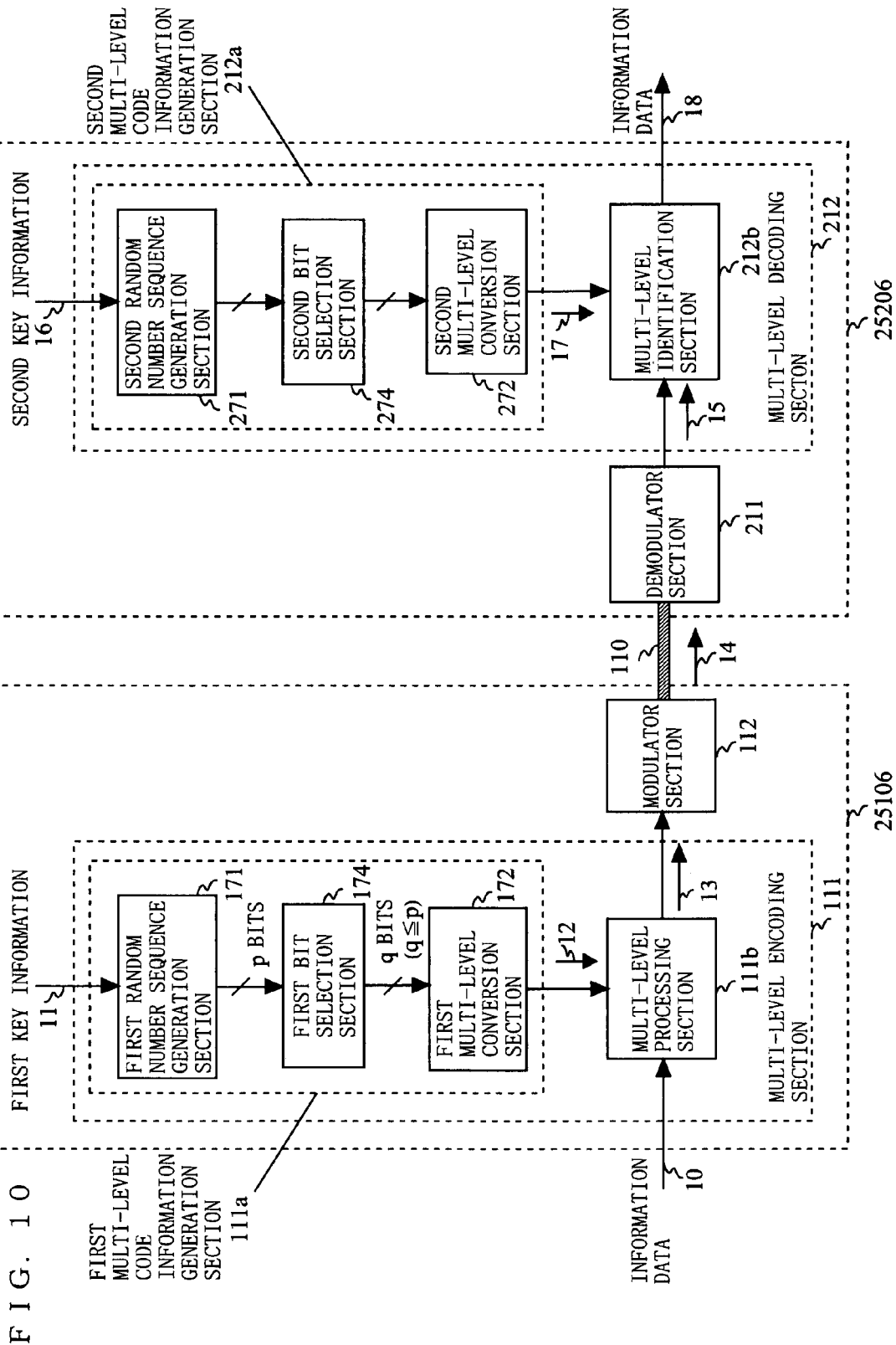
FIG. 10 is a block diagram showing an example of a constitution of a data communication apparatus according to a sixth embodiment of the present invention.

FIG. 10 is a block diagram showing an example of a constitution of a data communication apparatus according to a sixth embodiment of the present invention. In FIG. 10, the data communication apparatus according to the sixth embodiment of the present invention has a constitution in which a data transmitting apparatus 25106 and a data receiving apparatus 25206 are connected to each other via a transmission line 110. The data communication apparatus according to the sixth embodiment is different, compared to the above-described data communication apparatus according to the fifth embodiment, in constitutions of a first multi-level code generation section 111a and a second multi-level code generation section 212a. The first multi-level code generation section 111a includes a first random number sequence generation section 171, a first bit selection section 174, and a first multi-level conversion section 172. The second multi-level code generation section 212a includes a second random number sequence generation section 271, a second bit selection section 274, and a second multi-level conversion section 272.

The first random number sequence generation section 171 generates a predetermined pseudo-random number sequence, by using first key information 11 as an initial value. The first bit selection section 174 extracts a p-bit series (p is a given integer) from the pseudo-random number sequence generated by the first random number sequence generation section 171, selects, from the extracted bit series, and outputs a q-bit series (q is a given integer not larger than p). The first multi-level conversion section 172 converts the q-bit series outputted from the first bit selection section 174 into a multi-level code sequence 12 having levels corresponding to the bit series. That is, the first multi-level code generation section 111a generates the multi-level code sequence 12 based on a changed random number sequence which results from changing the bit series of the binary random number sequence generated based on the first key information 11.

In a similar manner, the second random number sequence generation section 271 generates a pseudo-random number sequence which corresponds to the pseudo-random number sequence outputted from the first random number sequence generation section 171, by using second key information 16 as an initial value. The second bit selection section 274 extracts a p-bit series (p is a given integer) from the pseudo-random number sequence generated by the second random number sequence generation section 271, and selects, from the extracted bit series, and outputs a q-bit series (q is a given integer not larger than p). The second multi-level conversion section 272 converts the q-bit series outputted from the second bit selection section 274 into a multi-level code sequence 17 having levels corresponding to the bit series. That is, the second multi-level code generation section 212a generates the multi-level code sequence 12 based on the changed random number sequence which results from changing the bit series of the binary random number sequence generated based on the second key information 16.

Figure 11:
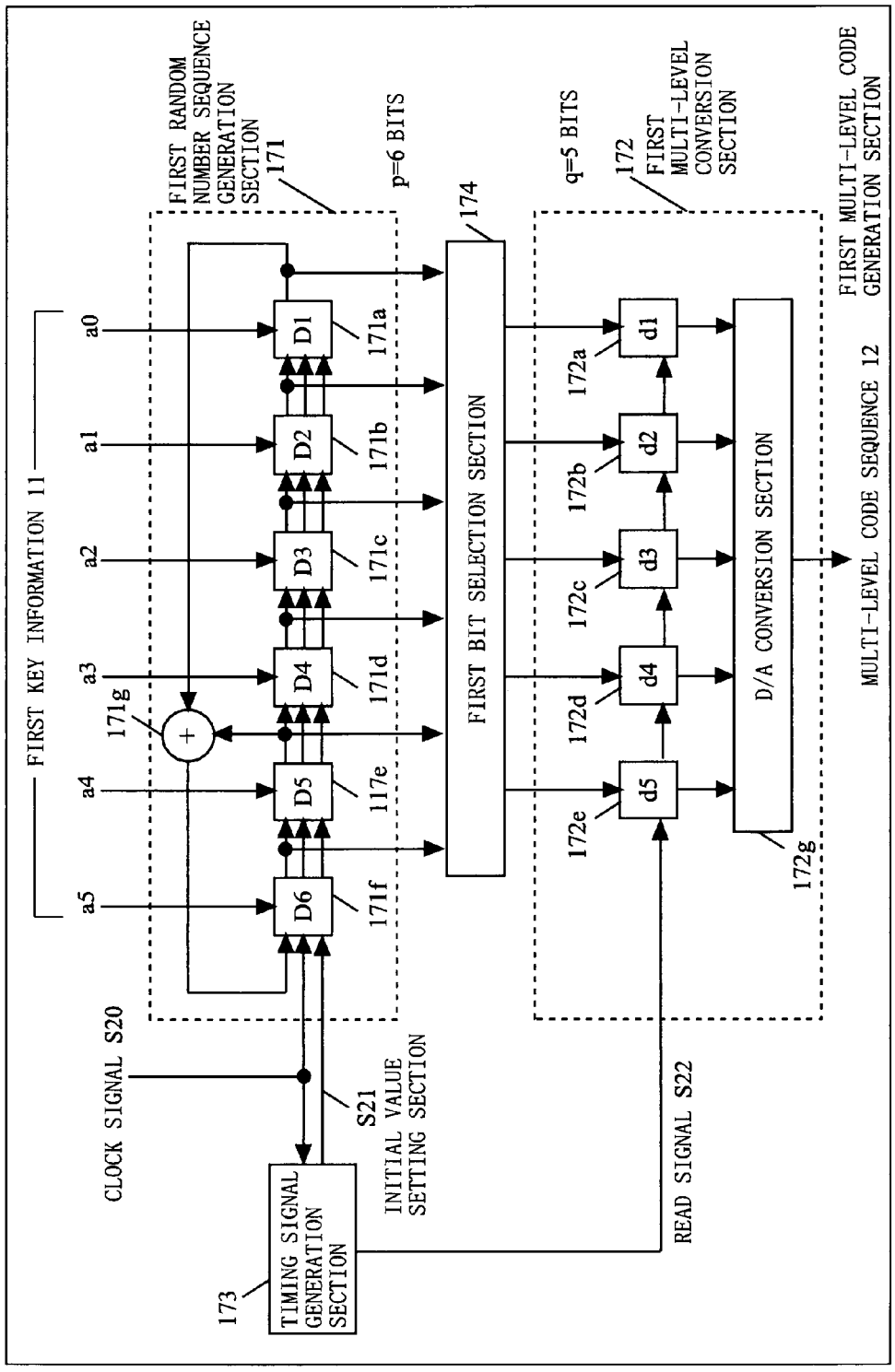
FIG. 11 is a diagram showing an example of a detail constitution of a first multi-level code generation section 111a according to the sixth embodiment of the present invention.

FIG. 11 is a diagram showing an example of a detail constitution of the first multi-level code generation section 111a according to the sixth embodiment of the present invention. Note that FIG. 11 shows, as with FIG. 9, an instantaneous situation in which respective shift registers 171a to 171f output and retain data D1 to D6, and respective latches 172a to 172e output and retain data d1 to d5. FIG. 12A is a diagram explaining an eavesdropping by a third party on the data communication apparatus according to the sixth embodiment of the present invention. FIG. 12B is a diagram explaining an effect of the data communication apparatus according to the sixth embodiment of the present invention. Hereinafter, the data communication apparatus according to the sixth embodiment of the present invention will be described in detail, with reference to FIG. 11, FIG. 12A, and FIG. 12B. The second multi-level code generation section 212a has the same constitution as the first multi-level code generation section 111a as shown in FIG. 11, and thus the description thereof will be omitted.

First, the eavesdropping by the third party will be described. It is assumed that the third party who is the eavesdropper receives and decrypts a modulated signal 14 using a constitution corresponding to a data receiving apparatus held by a legitimate receiving party or a further sophisticated data receiving apparatus. As a basic method of the eavesdropping like this, there is a "know-plain-text attack" which attempts direct obtainment of a cipher key (the multi-level code sequence 12) by previously setting information data 10, which is to be transmitted by a transmitter, to a known data (e.g. all "0", or all "1", etc.) in any manner and obtaining a cipher text (a multi-level signal 13 or a modulated signal 14) generated as a result. With respect to such attack, the data communication apparatus of the present invention can prevent an accurate obtainment of the cipher key by the third party, as above described, by using, for example, a quantum noise which is generated when an optical signal is detected.

Nonetheless, in the case where the quantum noise is not sufficiently large, it is likely that the cipher key is obtained by the third party and that the cipher text is decrypted easily, as a result. The eavesdropping by the third party like this will be described, with reference to FIG. 12A. The first multi-level code generation section 111a to be used for explanation of FIG. 12A has a constitution corresponding to that of the first multi-level code generation section 111a as shown in the above-described fifth embodiment (see FIG. 9). Further, in a description hereinafter, the first random number sequence generation section 171 has, as with a case of FIG. 9, a linear feedback shift register including 6 shift registers.

The first random number sequence generation section 171 sets 6 bits (a0 to a5), which constitutes the first key information 11, to the respectively corresponding shift registers 171a to 171f by using an input of an initial value setting signal S21 as a trigger, and generates a binary random number sequence by using the clock signal S20 as reference timing. The first multi-level conversion section 172 extracts, by using an input of a read signal S22 as a trigger, the binary random number sequence for each p bits (p=6 in FIG. 9) in a parallel manner, and converts the extracted binary random number sequence into the multi-level code sequence 12 having a total level number of $2^p (2^6)$, based on, for example, a binary-to-decimal conversion. The third party who is the eavesdropper obtains the multi-level code sequence 12 as it is, and then obtains the binary random number sequence which is the same as that generated by the first random number sequence generation section 171 based on the binary-to-decimal conversion.

Here, it is generally known that with regard to a pseudo-random number series generated by the linear feedback shift register as shown in FIG. 9, if a bit sequence thereof can be obtained in part consecutively, then bit sequence thereafter can be easily predicted. For example, in accordance to a Berlekamp-Massey method (hereinafter referred to as a BM method), with respect to a register number k (k=6 in FIG. 9) of the linear feedback shift register used for generating the pseudo-random numbers, 2k-bit pseudo-random numbers are obtained consecutively, whereby a constitution (tap location, an initial value) of the linear feedback shift register can be derived easily, and consequently random number sequence thereafter can be predicted.

Contrastingly, in the case of the first multi-level code generation section 111a (the second multi-level code generation section 212a) according to the sixth embodiment of the present invention, the first bit selection section 174 subtracts a predetermined 1 bit from p=6-bit binary random number sequence, which is extracted from the first random number sequence generation section 171 in the parallel manner, as shown in FIG. 11, and outputs remaining q=5-bit binary random number sequence. And then the multi-level conversion section 172 converts the q=5-bit binary random number sequence outputted by the first bit selection section 174 into the multi-level code sequence 12.

An action of the first multi-level code generation section 111a for the above-described case will be described in detail, with reference to FIG. 12B. As shown in FIG. 12B, for example, the first bit selection section 174 subtracts, for example, a second bit (D2) from 6 bits (D1 to D6) outputted from the first random number sequence generation section 171 and selects remaining 5 bits, and outputs the same to the first multi-level conversion section 172. That is, the first multi-level code generation section 111a according to the sixth embodiment of the present invention does not convert the binary random number sequence, which is outputted from the first random number sequence generation section 171, as it is, into the multi-level code sequence 12, but converts the binary random number sequence into the multi-level code sequence 12 after causing parts of the bits of the binary random number sequence to be lost/concealed intentionally.

Figure 13:
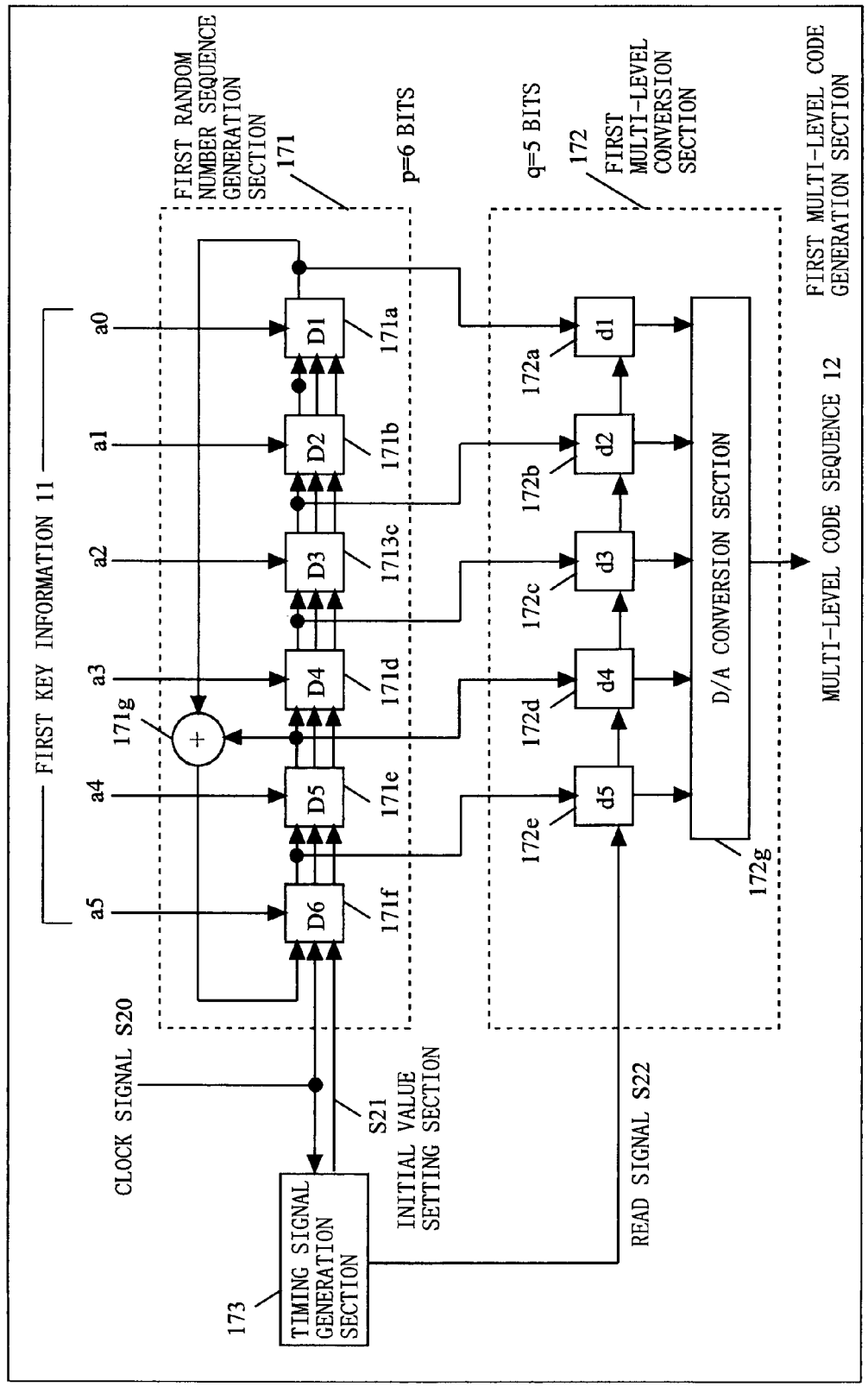
FIG. 13 is a block diagram showing an example of another constitution of the first multi-level code generation section 111a according to the sixth embodiment of the present invention.

Note that the first multi-level code generation section 111a (the second multi-level code generation section 212a) according to the sixth embodiment of the present invention may have a constitution as shown in FIG. 13. FIG. 13 is a block diagram showing an example of another constitution of the first multi-level code generation section 111a according to the sixth embodiment of the present invention. That is, the first multi-level code generation section 111a may, as shown in FIG. 13, subtract previously fixed predetermined bits from the p-bit binary random number sequence, which is extracted from the first random number sequence generation section 171 in the parallel manner, and output remaining q bits (remaining output signal after output signals of predetermined shift registers being subtracted) to the first multi-level conversion section 172. Note that in the example of FIG. 13, the remaining output signals after output signal D2 of the shift register 171b being subtracted are outputted to the first multi-level code conversion section 172.

Figure 14:
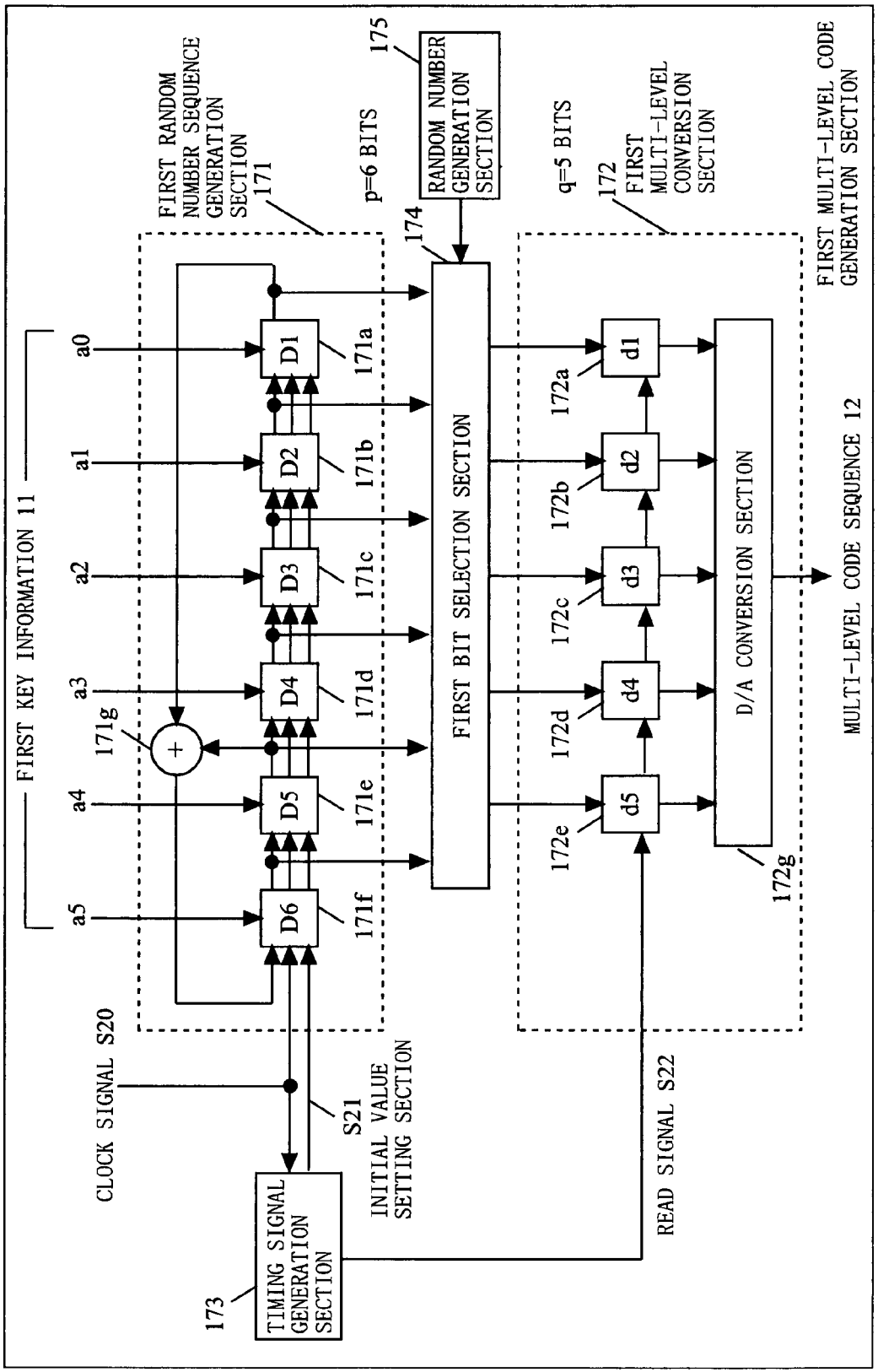
FIG. 14 is a block diagram showing an example of another constitution of the first multi-level code generation section 111a according to the sixth embodiment of the present invention.

Further, more preferably, the first multi-level code generation section 111a (the second multi-level code generation section 212a) according to the sixth embodiment of the present invention may have a constitution as shown in FIG. 14. FIG. 14 is a block diagram showing an example of another constitution of the first multi-level code generation section 111a according to the sixth embodiment of the present invention. That is, the first multi-level code generation section 111a may subtract, as shown in FIG. 14, randomly selected bits from p-bit binary random number sequence, which is extracted from the first random number sequence generation section 171 in the parallel manner, and output remaining q bits (remaining output signals after output signals of given shift registers being subtracted) to the first multi-level conversion section 172. Specifically, the first bit selection section 174 selects, in accordance with pseudo-random numbers outputted from the random number generation section 175, bits to be subtracted from the p-bit binary random number sequence which is extracted from the first random number sequence generation section 171 in the parallel manner, and subtracts the selected bits, and then outputs the remaining q bits to the first multi-level conversion section 172.

Figure 15:
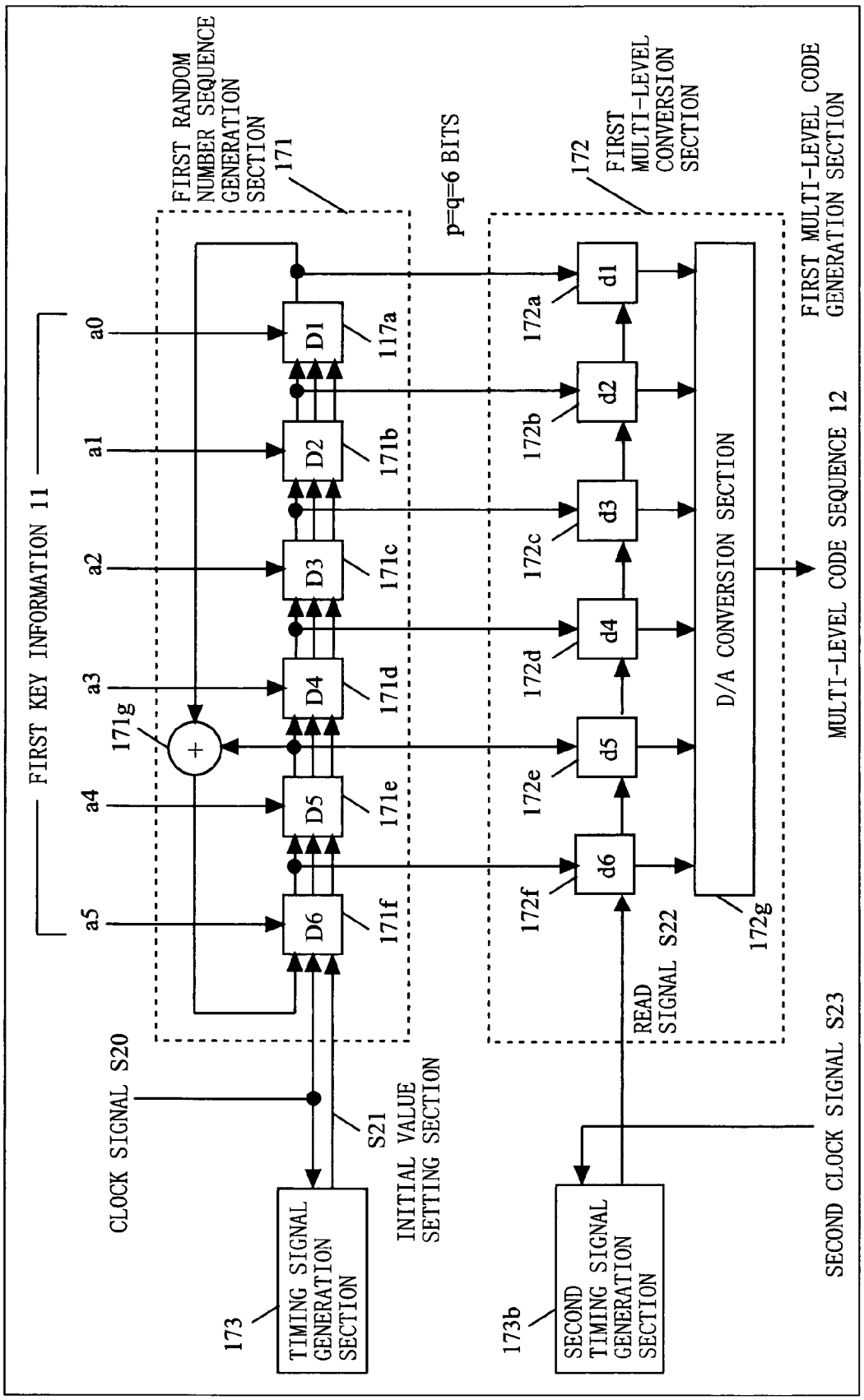
FIG. 15 is a block diagram showing an example of another constitution of the first multi-level code generation section 111a according to the sixth embodiment of the present invention.

Further, the first multi-level code generation section 111a (the second multi-level code generation section 212a) according to the sixth embodiment of the present invention may have a constitution as shown in FIG. 15. FIG. 15 a block diagram showing an example of another constitution of the first multi-level code generation section 111a according to the sixth embodiment of the present invention. That is, the first multi-level code generation section 111a further includes, as shown in FIG. 15, a second timing signal generation section 173b which provides the read signal S22 to the first multi-level conversion section 172, and in addition, the second timing signal generation section 173b acts asynchronously to the first random number sequence generation section 171 by using a second clock signal S23 as reference timing.

Figure 16:
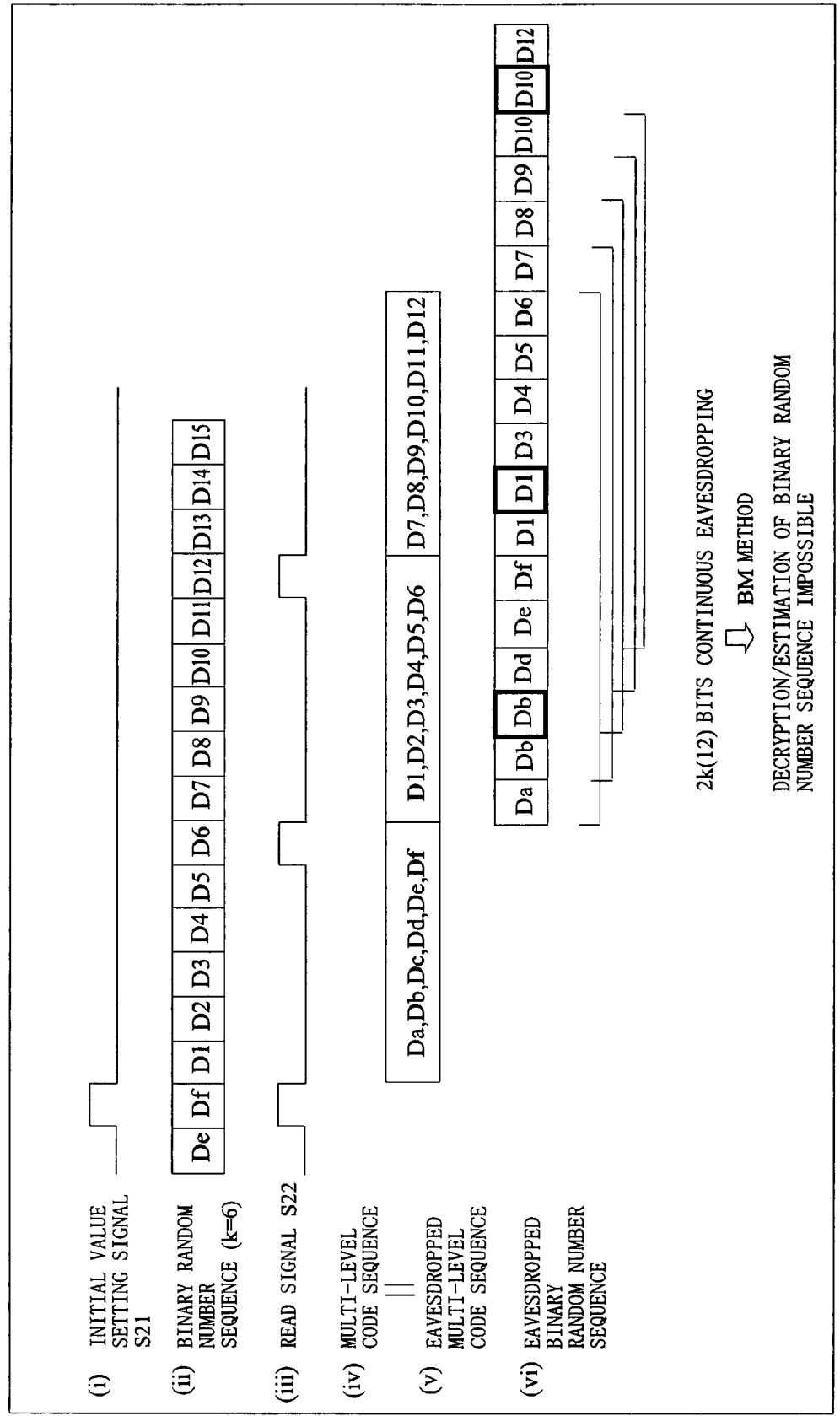
FIG. 16 is a diagram explaining an effect of the first multi-level code generation section 111a shown in FIG. 15.

Accordingly, the output signals (e.g. D1 to D6) from the shift registers 171a to 171b which constitutes the first random number sequence generation section 171 cannot be accurately identified by the latches 172a to 172b which constitutes the first multi-level conversion section 172, and for example, as shown in FIG. 16, predetermined bits (Dc, D2, and D12 in FIG. 16) are lost, and some bits (Db, D1, and D10 in FIG. 16) are read in a redundant manner. That is, the first multi-level code generation section 111a shown in FIG. 15 does not converts the binary random number sequence, which are outputted from the first random number sequence generation section 171, as it is, into the multi-level code sequence 12, but converts the binary random number sequence into the multi-level code sequence 12 after causing parts of the bits of the binary random number sequence to be lost/concealed intentionally. With the constitution, even under the circumstances where the quantum fluctuation is not sufficiently large, and a cipher text can be easily obtained by the third party, it is possible to intentionally prevent consecutive obtainment of 2k-bit pseudo-random numbers and cause decryption/decoding of pseudo-random number sequence by the BM method or the like to be difficult.

With the constitution as above described, even under the circumstances where the quantum fluctuation is not sufficiently large, and a cipher text can be easily obtained by the third party, it is possible to intentionally prevent consecutive obtainment of 2k-bit pseudo-random numbers and cause decryption/decoding of pseudo-random number sequence by the BM method or the like to be difficult.

As above described, according to the sixth embodiment of the present invention, when the information data 10 to be transmitted is encoded as the multi-level signal 13, an interval between signal levels of the multi-level signal 13 is set appropriately with respect to a noise level included in a receiving signal, whereby quality of the receiving signal at the time of the eavesdropping by the third party is crucially deteriorated, and it is possible to cause decryption/decoding of the multi-level signal by the third party to be difficult. Further, even in the case where the cipher text is obtained by the third party, it is possible to provide a further safe data communication apparatus by generating a multi-level key such that key information thereof cannot be estimated easily.

Seventh Embodiment

Figure 17:
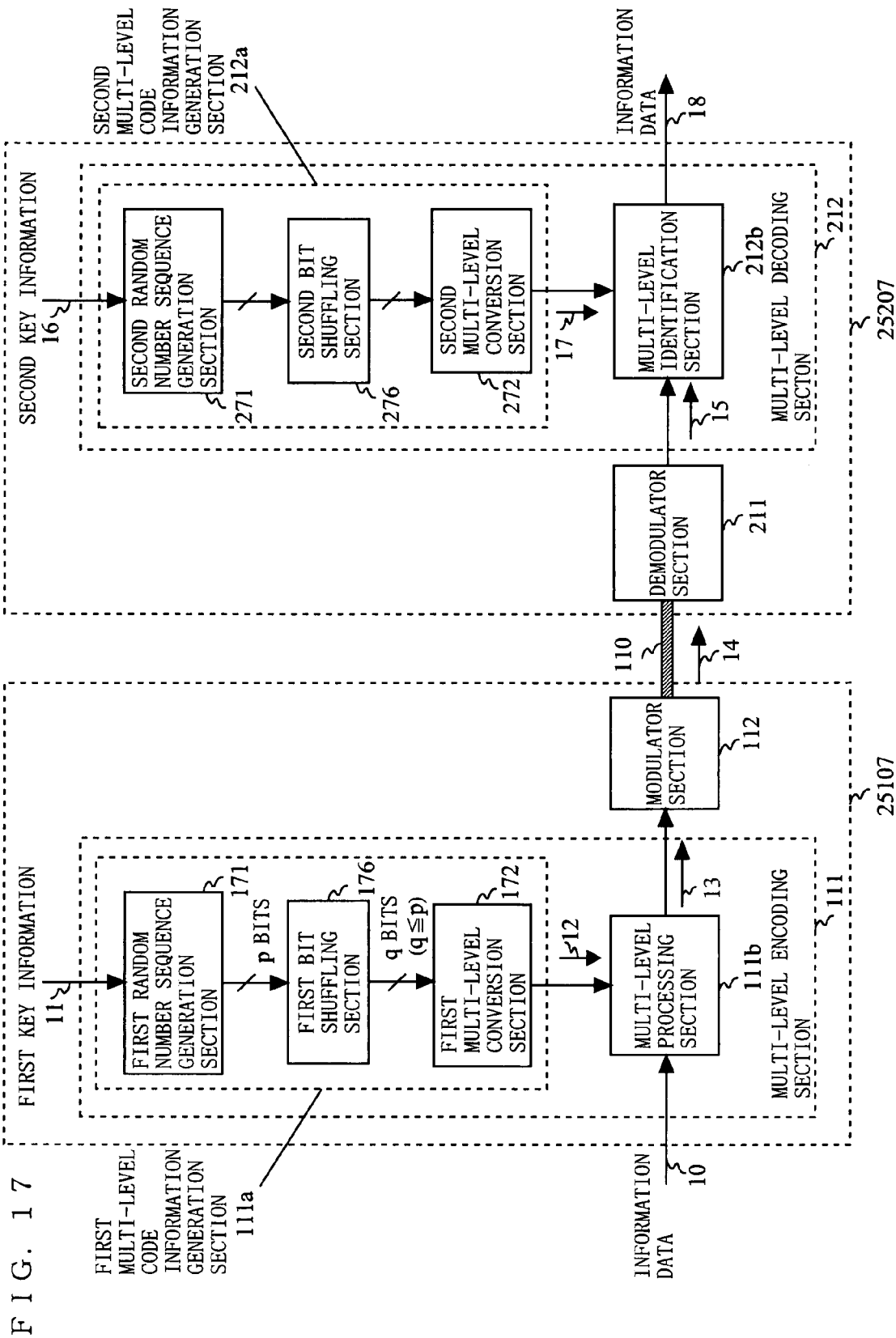
FIG. 17 is a block diagram showing an example of a constitution of a data communication apparatus according to a seventh embodiment of the present invention.

FIG. 17 is a block diagram showing an example of a constitution of a data communication apparatus according to a seventh embodiment of the present invention. In FIG. 17, the data communication apparatus according to the seventh embodiment of the present invention has a constitution in which a data transmitting apparatus 25107 and a data receiving apparatus 25207 are connected to each other via a transmission line 110. The data communication apparatus according to the seventh embodiment is different, compared to the above-described fifth and sixth embodiments, in constitutions of a first multi-level code generation section 111a and a second multi-level code generation section 212a. The first multi-level code generation section 111a includes a first random number sequence generation section 171, and a first bit shuffling section 176, and a first multi-level conversion section 172. The second multi-level code generation section 212a includes a second random number sequence generation section 271, a second bit shuffling section 276, and a second multi-level conversion section 272.

The first random number sequence generation section 171 generates a predetermined pseudo-random number sequence, by using first key information as an initial value. The first bit shuffling section 176 extracts a p-bit series (p is a given integer) from the pseudo-random number sequence generated by the first random number sequence generation section 171, and outputs the extracted bit series after shuffling an order thereof. The first multi-level conversion section 172 converts a q-bit series (p=q in this example) outputted by the first bit shuffling section 176 into a multi-level code sequence 12 having levels corresponding the bit series. In a similar manner, the second random number sequence generation section 271 generates a predetermined pseudo-random number sequence by using second key information 16 as an initial value. The second bit shuffling section 276 extracts a p-bit series (p is a given integer) from the pseudo-random number sequence generated by the second random number sequence generation section 271, and outputs the extracted bit series after shuffling an order thereof. The second multi-level conversion section 272 converts a q-bit series (p=q in this example) outputted by the second bit shuffling section 276 into a multi-level code sequence 17 having levels corresponding the bit series.

Figure 18:
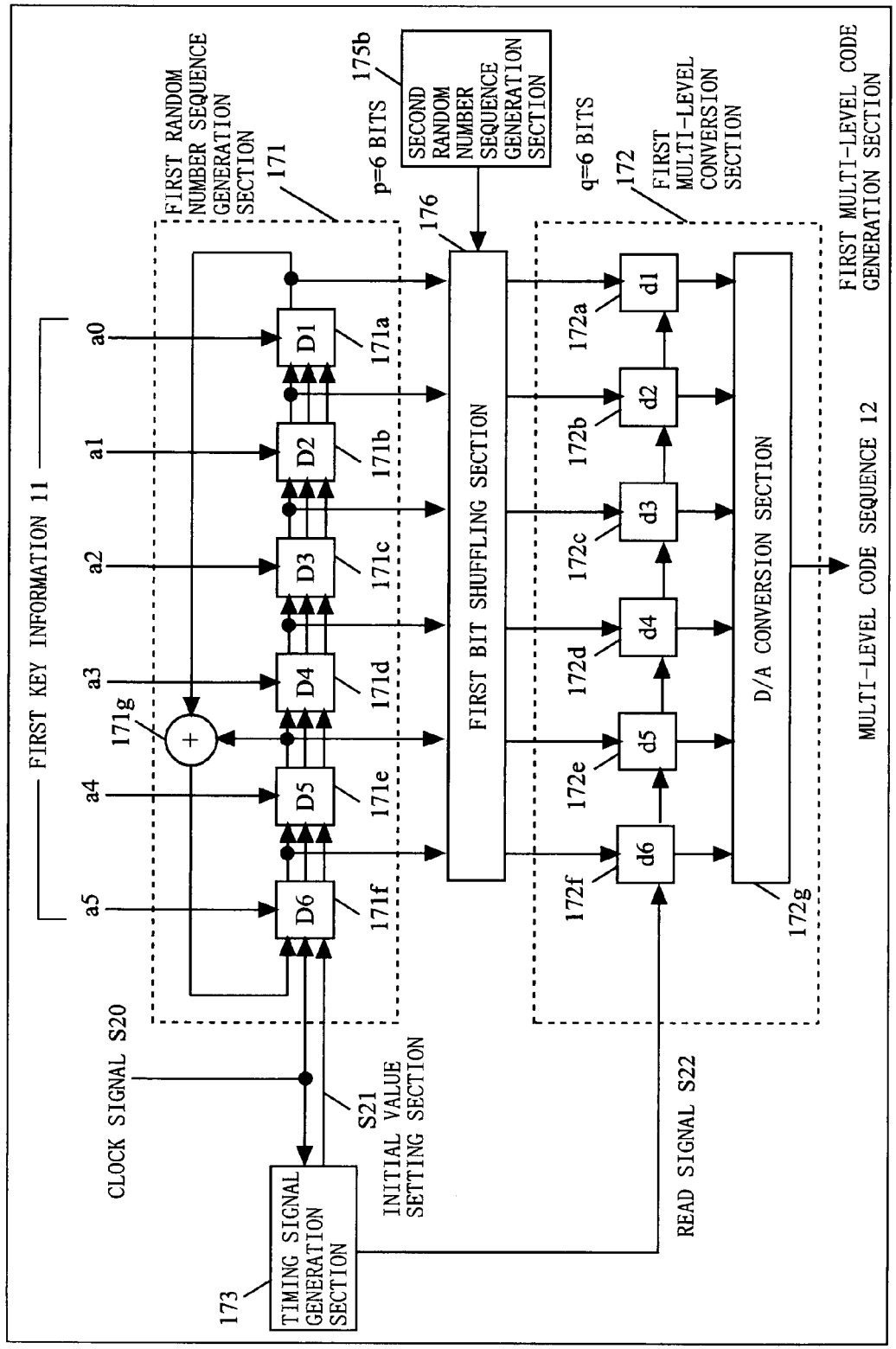
FIG. 18 is a block diagram showing an example of a detail constitution of a first multi-level code generation section 111a according to the seventh embodiment of the present invention.
Figure 19:
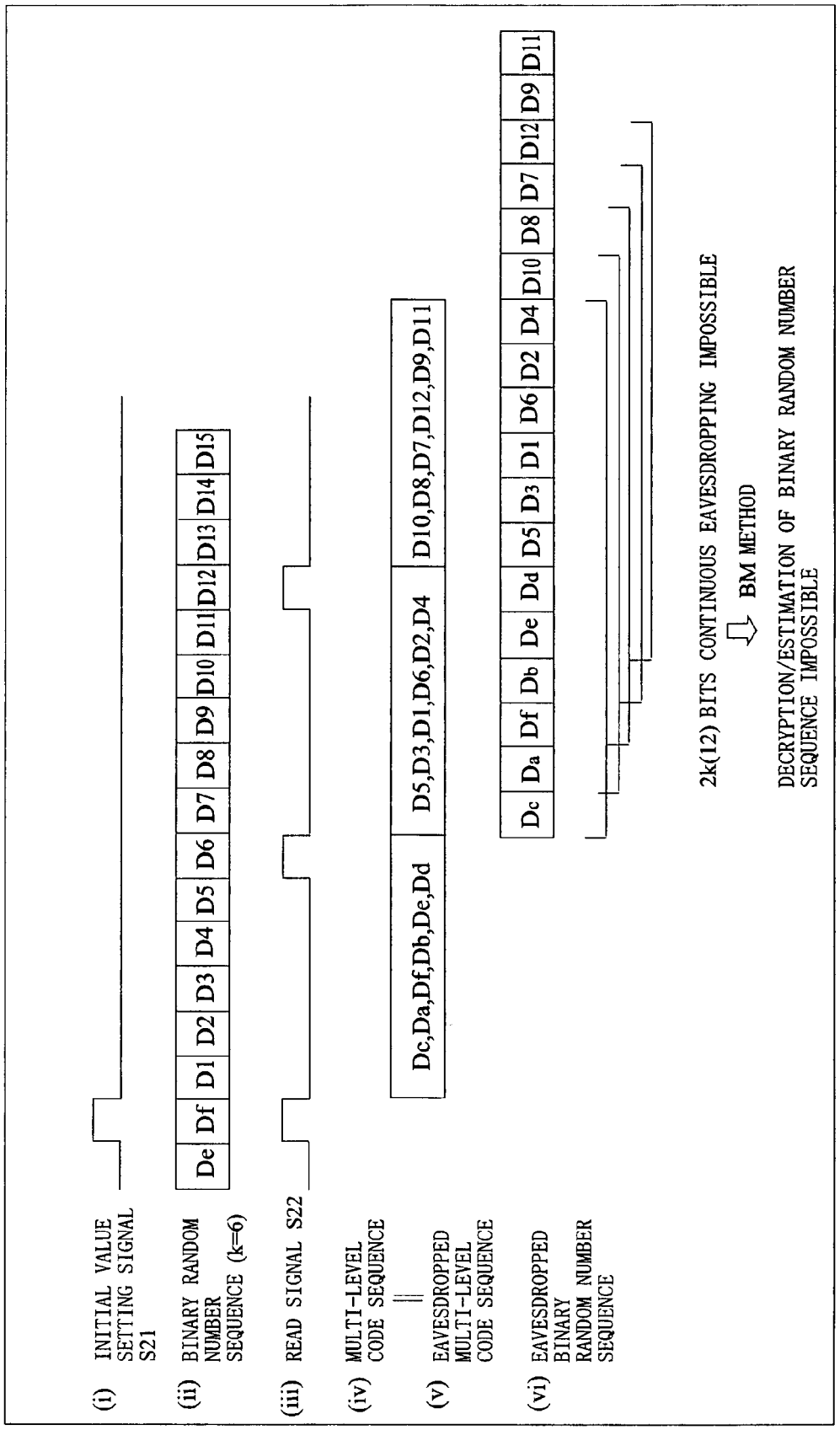
FIG. 19 is a diagram explaining an effect of the data communication apparatus according to the seventh embodiment of the present invention.

FIG. 18 is a block diagram showing an example of a detail constitution of the first multi-level code generation section 111a according to the seventh embodiment of the present invention. FIG. 19 is a diagram explaining an effect of the data communication apparatus according to the seventh embodiment of the present invention. Hereinafter, the data communication apparatus according to the seventh embodiment of the present invention will be described in detail, with reference to FIG. 19.

First, an eavesdropping by a third party will be described. It is assumed that, in a similar manner to the above-described sixth embodiment, the third party who is an eavesdropper uses a constitution corresponding to a data receiving apparatus held by a legitimate receiving party or a further sophisticated data receiving apparatus, and decrypts a received modulated signal 14 by means of a "known-plain-text attack" or the like. That is, as shown in FIG. 12A, in the case where a quantum noise is not sufficiently large, it is likely that a cipher key is obtained by the third party, and as a result, a cipher text may be decrypted easily.

Contrastingly, in the case of the first multi-level code generation section 111a (the second multi-level code generation section 212a) according to the seventh embodiment of the present invention, the bit shuffling section 176 once inputs, as shown in FIG. 18, a p=6-bit binary random number sequence extracted from the first random number sequence generation section 171 in a parallel manner, and outputs a q=6-bit binary random number sequence which is obtained by shuffling an order of the inputted q=6-bit binary random number sequence. Next, the first multi-level conversion section 172 converts the q=6-bit binary random number sequence outputted by the first bit shuffling section 176 into the multi-level code sequence 12. For example, as shown in FIG. 19, the bit shuffling section 176 shuffles an order of 6 bits (D1, D2, D3, D4, D5, D6) outputted from the first random number sequence generation section 171, and outputs 6 bits (D5, D3, 1, 6, D2, D4), which are obtained as a result of the shuffling, to the first multi-level conversion section 172. That is, the first multi-level code generation section 111a according to the seventh embodiment of the present invention does not converts the binary random number sequence outputted from the first random number sequence generation section 171 as it is into the multi-level code sequence 12, but converts the binary random number sequence into the multi-level code sequence 12 after shuffling the order thereof intentionally.

The third party who is the eavesdropper does not share key information 11, 16 as described with reference to FIG. 4, and thus it is assumed that the third party erroneously identifies bits of the multi-level signal because of a noise element overlapped on the modulated signal 14. As an identification error of the multi-level signal like this, it is likely that the eavesdropper erroneously identifies information corresponding to lower bits of the multi-level signal particularly, and consequently, it is likely to cause a periodical error in a specific part of information in a binary signal after identified. The first multi-level code generation section 111a according to the seventh embodiment of the present invention shuffles a bit order of the binary random number sequence generated by the first random number sequence generation section 171, thereby spreading an identification error not only with respect to the information corresponding to the lower bits of the multi-level signal in the identified binary signal, but also with respect to information corresponding to upper bits thereof. That is, it is possible for the first multi-level code generation section 111a to disable prediction of a position of the identification error in the multi-level signal.

Further, more preferably, the first multi-level code generation section 111a does not fix but changes, as needed, a procedure of bit shuffling by the first bit shuffling section 119. Specifically, as shown in FIG. 18, the bit shuffling section 176 switches, in accordance with a value of the pseudo-random numbers outputted from the second random number generation section 175b, the bit order of the binary random number sequence generated by the first random number sequence generation section 171, approximately at random.

Figure 20:
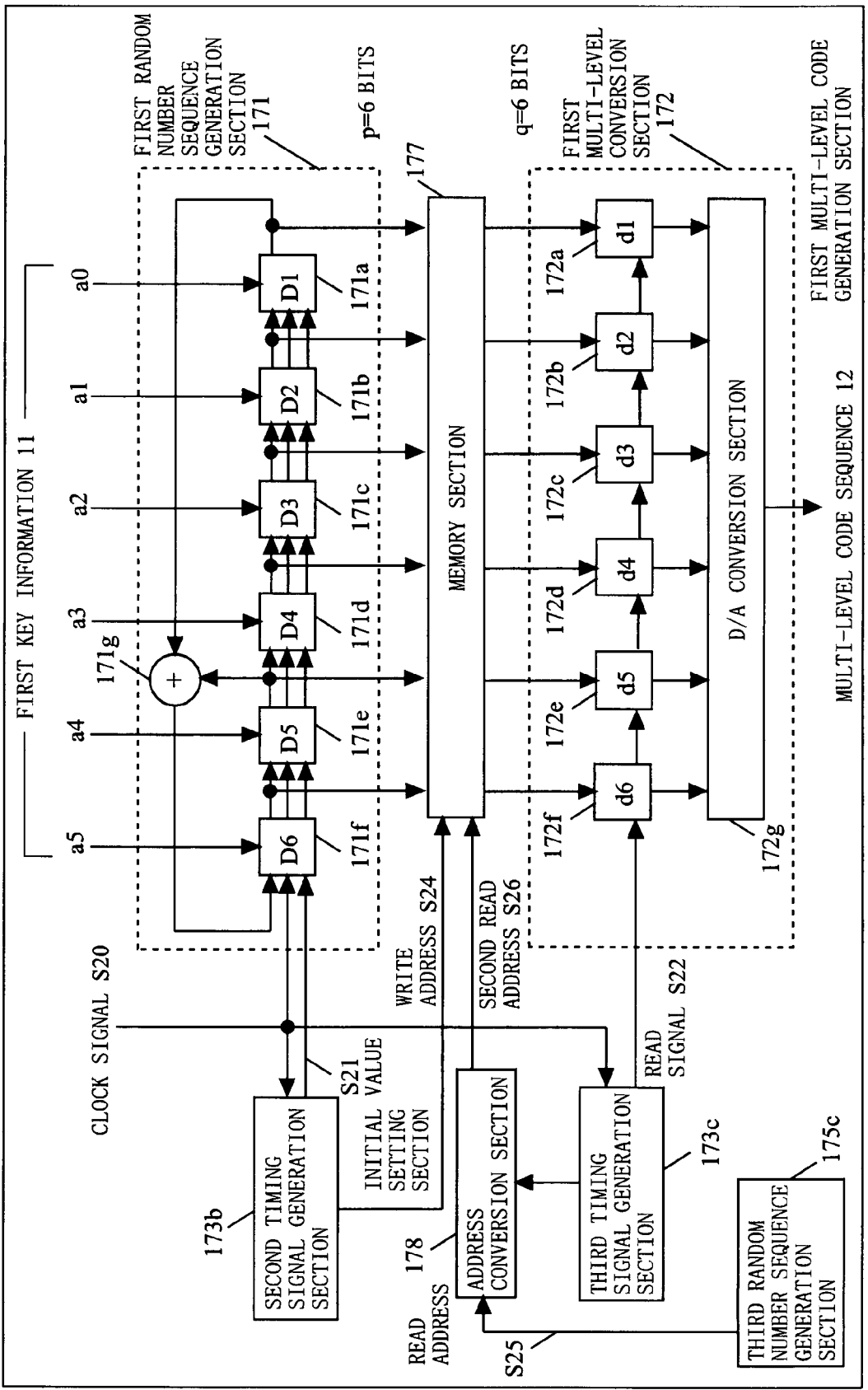
FIG. 20 is a block diagram showing an example of another constitution of the first multi-level code generation section 111a according to the seventh embodiment of the present invention.
Figure 21:
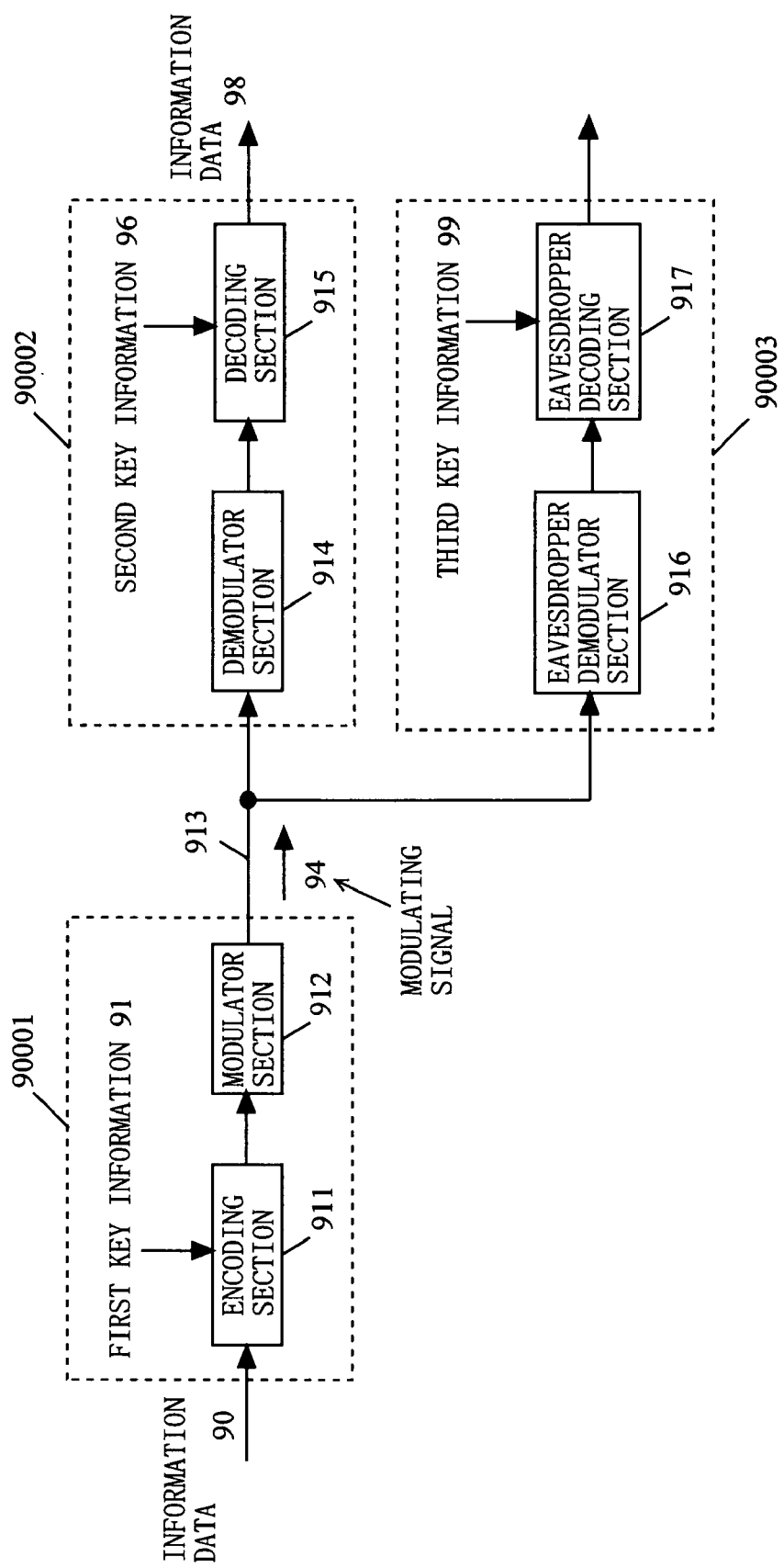
FIG. 21 is a block diagram showing a constitution of a conventional data communication apparatus.

Further, the first multi-level code generation section 111a (the second multi-level code generation section 212a) according to the seventh embodiment of the present invention may have a constitution as shown in FIG. 20. FIG. 20 is a block diagram showing an example of another constitution of the first multi-level code generation section 111a according to the seventh embodiment of the present invention. In FIG. 20, the first multi-level code generation section 111a has a memory section 177, a second timing signal generation section 173b, a third timing signal generation section 173c, a third random number generation section 175c, and an address conversion section 178 instead of the timing signal generation section 173 and the first bit shuffling section 176.

The second timing signal generation section 173b generates and outputs a write address S24 together with a clock signal S20 and an initial value setting signal S21 both of which are provided to the first random number sequence generation section 171. The third timing signal generation section 173c generates, by using the clock signal S20 as reference timing, a read address S25 together with a read signal S22 which is provided to the first multi-level conversion section 172. The address conversion section 178 converts the read address S25, in accordance with a value of pseudo-random numbers outputted from the third random number generation section 175c, and then outputs the converted read address S25 as a second read address S26. The memory section 177 writes (records) a p=6-bit binary random number sequence, which is extracted from the first random number sequence generation section 171 in a parallel manner, into an address designated by the write address S24, and in addition, reads a p=6-bit binary random number sequence from an address designated by the second read address S26, and then outputs the read address to the first multi-level conversion section 172. The first multi-level conversion section 172 converts the inputted binary random number sequence into the multi-level code sequence 12.

With the constitution as above described, even under circumstances where a quantum fluctuation is not sufficiently large, and where the cipher text can be easily obtained by the third party, it is possible to intentionally prevent consecutive obtainment of 2k-bit pseudo-random numbers and cause decryption/decoding of the multi-level signal by the third party to be difficult.

As above-described, according to the seventh embodiment of the present invention, when the information data 10 to be transmitted is encoded as the multi-level signal 13, an interval between signal levels of the multi-level signal 13 is set appropriately with respect to a noise level included in a receiving signal, whereby quality of the receiving signal at the time of the eavesdropping by the third party is crucially deteriorated, and it is possible to cause decryption/decoding of the multi-level signal by the third party to be difficult. Further, even in the case where the cipher text is obtained by the third party, it is possible to provide a further safe data communication apparatus by generating a multi-level key such that key information thereof cannot be estimated easily.

The data communication apparatus according to the prevent invention is useful for a safe secret communication apparatus or the like which is not susceptible to eavesdropping/interception.

While the invention has been described in detail, the foregoing description is in all aspects illustrative and not restrictive. It is understood that numerous other modifications and variations can be devised without departing from the scope of the invention.

What is claimed is:

1. A data transmitting apparatus for encrypting information data by using predetermined key information and performing secret communication with a receiving apparatus, the data transmitting apparatus comprising:

a multi-level code generation section for generating, based on the predetermined key information, a multi-level code sequence in which a signal level changes so as to approximate random numbers;

a multi-level processing section for combining the multi-level code sequence and the information data, and generating a multi-level signal having a plurality of levels corresponding to a combination of the multi-level code sequence and the information data; and a modulator section for treating the multi-level signal with predetermined modulation processing and generating a modulated signal, wherein the multi-level code generation section generates a bit stream based on the predetermined key information, the bit stream being a binary pseudo-random number, wherein the multi-level code generation section obtains a modified bit stream by regularly or irregularly selecting, deleting, or inversing a bit of the bit stream by using a predetermined method, and wherein the multi-level code generation section generates the multi-level code sequence based on the modified bit stream.

2. The data transmitting apparatus according to claim 1, wherein the multi-level code generation section includes:

a random number sequence generation section for generating the bit stream based on the predetermined key information;

a bit selection section for selecting an intended bit series from the bit stream generated by the random number sequence generation section and outputting the selected bit series as the modified bit stream; and a multi-level conversion section for converting the modified bit stream into the multi-level code sequence.

3. The data transmitting apparatus according to claim 2, wherein the multi-level code generation section further includes a random number generation section for generating a pseudo-random number sequence, and wherein the bit selection section changes, based on the pseudo-random number sequence generated by the random number generation section, the intended bit series selected from the bit series generated by the random number sequence generation section.

4. The data transmitting apparatus according to claim 1, wherein the multi-level code generation section includes:

a random number sequence generation section for generating the bit stream based on the predetermined key information; and a multi-level conversion section for setting a remaining bit series, after subtracting a previously fixed predetermined bit series from the bit stream generated by the random number sequence generation section, as the modified bit stream, and for converting the modified bit stream into the multi-level code sequence.

5. The data transmitting apparatus according to claim 1, wherein the multi-level code generation section includes:

a random number sequence generation section for generating the bit stream based on the predetermined key information; and a multi-level conversion section for converting the bit stream generated by the random number sequence generation section into the multi-level code sequence, and wherein the multi-level conversion section treats, by acting asynchronously to the random number sequence generation section, the bit stream generated by the random number sequence generation section as the modified bit stream.

6. The data transmitting apparatus according to claim 1, wherein the multi-level code generation section includes:

a random number sequence generation section for generating the bit stream based on the predetermined key information;

a bit shuffling section for outputting a bit series of the bit stream generated by the random number sequence generation section, after changing an order of the bit stream, as the modified bit stream; and a multi-level conversion section for converting the modified bit stream into the multi-level code sequence.

7. The data transmitting apparatus according to claim 6, wherein the multi-level code generation section further includes a random number generation section for generating a pseudo-random number sequence, and the bit shuffling section determines a regulation for shuffling the bit stream generated by the random number sequence generation section, in accordance with the pseudo-random number sequence generated by the random number generation section.

8. The data transmitting apparatus according to claim 1, wherein the multi-level code generation section includes:

a random number sequence generation section for generating the bit stream based on the predetermined key information;

a memory section for storing the bit stream generated by the random number sequence generation section; and a multi-level conversion section for converting the bit stream read from the memory section into the multi-level code sequence, and the multi-level conversion section treats, by changing a read address of the memory section, the bit stream generated by the random number sequence generation section as the modified bit stream.

9. The data transmitting apparatus according to claim 2, wherein the random number sequence generation section includes a linear feedback shift register including a plurality of shift registers and an exclusive OR element.

10. The data transmitting apparatus according to claim 2, wherein the multi-level conversion section includes a plurality of latches and a D/A conversion section which converts a bit series outputted from the plurality of latches into the multi-level code sequence.

11. A data receiving apparatus for receiving information data encrypted by using predetermined key information and performing secret communication with a transmitting apparatus, the data receiving apparatus comprising:

a multi-level code generation section for generating, based on the predetermined key information, a multi-level code sequence in which a signal level changes so as to approximate random numbers;

a demodulator section for demodulating, in a predetermined demodulation method, a modulated signal received from the transmitting apparatus so as to be outputted as a multi-level signal having a plurality of levels corresponding to a combination of the information data and the multi-level code sequence; and an identification section for identifying, based on the multi-level code sequence, the information data from the multi-level signal, wherein the multi-level code generation section generates a bit stream based on the predetermined key information, the bit stream being a binary pseudo-random number, wherein the multi-level code generation section obtains a modified bit stream by regularly or irregularly selecting, deleting, or inversing a bit of the bit stream by using a predetermined method, and wherein the multi-level code generation section generates the multi-level code sequence based on the modified bit stream.

12. A data transmitting method for encrypting information data by using predetermined key information and performing secret communication with a receiving apparatus, the data transmitting method comprising:

a multi-level code generating step of generating, based on the predetermined key information, a multi-level code sequence in which a signal level changes so as to approximate random numbers;

a multi-level processing step of combining the multi-level code sequence and the information data, and generating a multi-level signal having a plurality of levels corresponding to a combination of the multi-level code sequence and the information data; and a modulating step of generating a modulated signal by treating the multi-level signal with predetermined modulating processing, wherein the multi-level code generation step generates a bit stream based on the predetermined key information, the bit stream being a binary pseudo-random number, wherein the multi-level code generating step obtains a modified bit stream by regularly or irregularly selecting, deleting, or inversing a bit of the bit stream by using a predetermined method, and wherein the multi-level code generating step generates the multi-level code sequence based on the modified bit stream.

13. A data receiving method for receiving information data encrypted by using predetermined key information and performing secret communication with a transmitting apparatus, the data receiving method comprising:

a multi-level code generating step of generating, based on the predetermined key information, a multi-level code sequence in which a signal level changes so as to approximate random numbers;

a demodulating step of demodulating, in a predetermined demodulation method, a modulated signal received from the transmitting apparatus so as to be outputted as a multi-level signal having a plurality of levels corresponding to a combination of the information data and the multi-level code sequence; and an identification step of identifying, based on the multi-level code sequence, the information data from the multi-level signal, wherein the multi-level code generating step generates a bit stream based on the predetermined key information, the bit stream being a binary pseudo-random number, wherein the multi-level code generating step obtains a modified bit stream by regularly or irregularly selecting, deleting, or inversing a bit of the bit stream by using a predetermined method, and wherein the multi-level code generating step generates the multi-level code sequence based on the modified bit stream.

* * * * *